(12) United States Patent  
Li

(10) Patent No.: US 7,940,470 B2  
(45) Date of Patent: May 10, 2011

(54) ZOOM LENS

(75) Inventor: Dayong Li, Saitama (JP)

(73) Assignee: Tamron Co., Ltd., Saitama-shi (JP)

(*) Notice: Subject to any disclaimer, the term of this patent is extended or adjusted under 35 U.S.C. 154(b) by 0 days.

(21) Appl. No.: 12/785,730

(22) Filed: May 24, 2010

(65) Prior Publication Data

US 2011/0002045 A1    Jan. 6, 2011

(30) Foreign Application Priority Data

Jul. 3, 2009   (JP) ................................. 2009-158657

(51) Int. Cl.  
    *G02B 15/14*    (2006.01)
(52) U.S. Cl. ........................................ 359/683; 359/676
(58) Field of Classification Search .................. 359/676, 359/683

See application file for complete search history.

(56) References Cited

U.S. PATENT DOCUMENTS

2009/0116121 A1* 5/2009 Take .............................. 359/687

FOREIGN PATENT DOCUMENTS

| JP | 2001-75008 A  | 3/2001  |
| JP | 2005-345714 A | 12/2005 |

* cited by examiner

*Primary Examiner* — William C Choi  
(74) *Attorney, Agent, or Firm* — Foley & Lardner LLP

(57) ABSTRACT

A zoom lens includes sequentially from an object side, a positive first lens group; a negative second lens group; a diaphragm; a positive third lens group; a positive fourth lens group; and a positive fifth lens group, wherein a first condition $0.8 \leq (SLM-(SLW+SLT)/2)/FW \leq 2.0$ and a second condition $F14t \leq 0$ are satisfied. SLW is a distance from the diaphragm at a wide angle edge to an imaging plane; SLM is a distance from the diaphragm at an intermediate zoom position to the imaging plane; SLT is a distance from the diaphragm at a telephoto edge to the imaging plane; FW is optical system focal length for infinity at the wide angle edge; and F14t is a combined focal length for the first to the fourth lens groups at the telephoto edge.

2 Claims, 12 Drawing Sheets imaging plane is SLT, where the focal length of the entire
ZOOM LENS

CROSS-REFERENCE TO RELATED APPLICATIONS

This application is based upon and claims the benefit of priority from the prior Japanese Patent Application No. 2009-158657, filed on Jul. 3, 2009, the entire contents of which are incorporated herein by reference.

BACKGROUND OF THE INVENTION

1. Field of the Invention

The present invention relates to a large diameter, high power zoom lens.

2. Description of the Related Art

Conventionally, a large number of variable focus lenses aimed at achieving high zoom ratios have been proposed. Such variable focus lenses, for example, include sequentially from an object side at least a positive first lens group, a negative lens group, a positive third lens group, a positive fourth lens group, and a positive fifth lens group, and focuses an image of an object by moving the fifth lens group (refer to Japanese Patent Application Laid-Open Publication Nos. 2005-345714 and 2001-75008).

The zoom lens recited in Japanese Patent Application Laid-Open Publication No. 2005-345714 includes at least 5 lens groups that are positive, negative, positive, positive, and positive respectively from the object side, has an angle of view exceeding 62° at the wide angle edge, and realizes a zoom ratio of 11.3 or greater. Further, the zoom lens recited in Japanese Patent Application Laid-Open Publication No. 2001-75008 includes at least 6 lens groups that are positive, negative, positive, positive, negative, and positive respectively from the object side, has an angle of view exceeding 42° at the wide angle edge, and realizes a zoom ratio of 11.1 or greater.

Although the zoom lenses recited respectively in Japanese Patent Application Laid-Open Publication Nos. 2005-345714 and 2001-75008 realize high zoom ratios of 11 or greater, the F number also significantly increases accompanying zoom and thus, enlarged images become dark. Furthermore, the angle of view is insufficient.

SUMMARY OF THE INVENTION

It is an object of the present invention to at least solve the above problems in the conventional technologies.

A zoom lens according to one aspect of the present invention includes sequentially from an object side, a positive first lens group; a negative second lens group; a diaphragm; a positive third lens group; a positive fourth lens group; and a positive fifth lens group, wherein a first condition $0.8 \leq (SLM-(SLW+SLT)/2)/FW \leq 2.0$ and a second condition $F14t \leq 0$ are satisfied. SLW is a distance from the diaphragm at a wide angle edge to an imaging plane; SLM is a distance from the diaphragm at an intermediate zoom position to the imaging plane; SLT is a distance from the diaphragm at a telephoto edge to the imaging plane; FW is optical system focal length for infinity at the wide angle edge; and F14t is a combined focal length for the first to the fourth lens groups at the telephoto edge.

The other objects, features, and advantages of the present invention are specifically set forth in or will become apparent from the following detailed description of the invention when read in conjunction with the accompanying drawings.

DETAILED DESCRIPTION OF THE PREFERRED EMBODIMENTS

Figure 1:
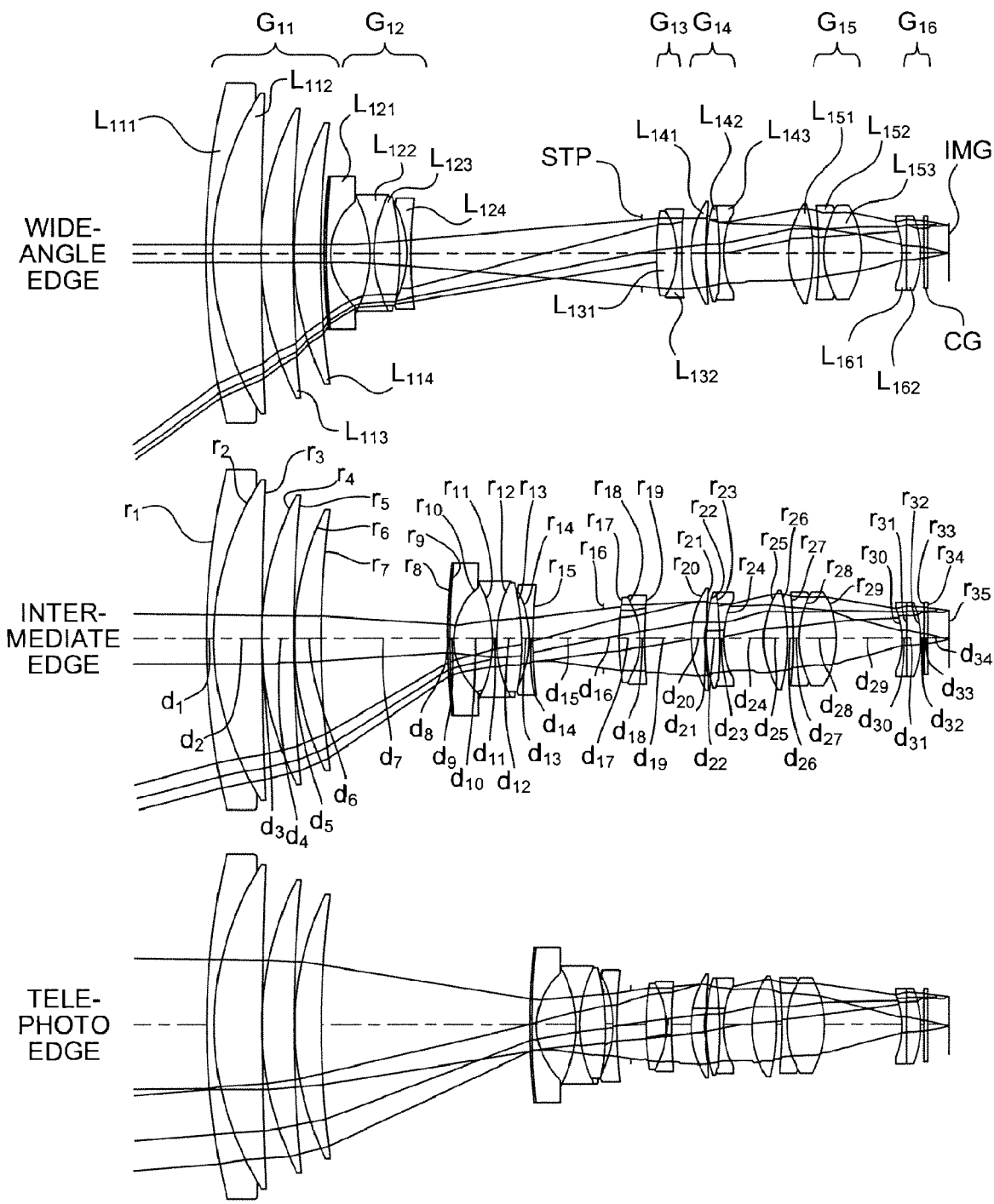
FIG. 1 is a cross sectional view (along the optical axis) of a zoom lens according to a first example.

Referring to the accompanying drawings, exemplary embodiments according to the present invention are explained in detail below.

The zoom lens according to the embodiment includes sequentially from the object side, a positive first lens group, a negative second lens group, a diaphragm, a positive third lens group, a positive fourth lens group, and a positive fifth lens group. By moving any among the second to the fourth lens groups along the optical axis, the zoom lens zooms from the wide angle edge to the telephoto edge. By moving the fifth lens group along the optical axis, the zoom lens corrects imaging plane (image location) variation accompanying zoom and focuses the image.

One object of the present invention is to provide a large diameter, high zoom ratio zoom lens that ensures a wide angle of view and is able to maintain a small F number over the entire zoom range. To achieve this object, various conditions are set as indicated below.

The zoom lens according to the embodiment preferably satisfies the following conditional expression, where a distance from the diaphragm at the wide angle edge to the imaging plane is SLW, a distance from the diaphragm at the intermediate zoom position to the imaging plane is SLM, and a distance from the diaphragm at the telephoto edge to the imaging plane is SLT, where the focal length of the entire optical system for infinity at the wide angle edge is FW.

$$0.8 \leq (SLM-(SLW+SLT)/2)/FW \leq 2.0 \quad (1)$$

Conditional expression (1) prescribes a condition to reduce the effective diameter of the first lens group while maintaining an angle of view of 70° or greater at the wide angle edge. By satisfying conditional expression (1), both wide angle and a reduction of the diameter of the first lens group are achievable. Below the lower limit of conditional expression (1), the effective diameter of the first lens group at the intermediate zoom position of the zoom lens becomes too large, making it difficult to achieve a reduction in the diameter of the first lens group while maintaining a wide angle of view. Above the upper limit of conditional expression (1), the effective diameter of the fifth lens group, which has a function of focusing, must be increased, resulting in an increased diameter of the fifth lens group and hence, the disadvantage of reduced focusing speed.

Further, the zoom lens according to the embodiment preferably satisfies the following conditional expression, where a combined focal length of the first to the fourth lens groups at the telephoto edge is F14.

$$F14t \leq 0 \qquad (2)$$

Conditional expression (2) prescribes a condition to reduce the effective diameters of the fourth and the fifth lens groups disposed behind the diaphragm, while maintaining a large diameter at the telephoto edge. By satisfying conditional expression (2), a bright image can be obtained even at the telephoto edge while at the same time, a reduction in the diameters of the fourth and the fifth lens groups can be achieved. Above the upper limit of conditional expression (2), reduction of the diameters of the fourth and the fifth lens groups becomes difficult and thus, values exceeding the upper limit are undesirable.

The zoom lens according to the embodiment preferably satisfies the following conditional expression, where among the lenses in the second lens group, the lens that is farthest on the object side has a surface on the object side that is formed to be aspheric, deviation of the paraxial curvature radius and the aspheric shape is S10 at a height that is 100% of the effective diameter of the aspheric surface, and the height of 100% of the effective diameter is H.

$$S10/H \geq 0.005 \qquad (3)$$

Conditional expression (3) prescribes the aspheric shape of the lens in the second lens group. In the second lens group, by forming the surface on the object side of the lens that is farthest on the object side to have an aspheric surface satisfying conditional expression (3), various types of aberration such as spherical aberration, astigmatism, distortion, etc. can be corrected well, over the entire zoom range. In the second lens group, if the surface on the object side of the lens that is farthest on the object side does not have an aspheric surface satisfying conditional expression (3), the correction of various types of aberration cannot be sufficiently performed.

As described above, by satisfying conditional expression (1) and (2), diameter reduction and maintenance of a wide angle of view are possible, making the zoom lens according to the present embodiment a large diameter zoom lens that is capable of high zoom ratios. Furthermore, in the second lens group, by forming the surface on the object side of the lens that is farthest on the object side to have an aspheric surface satisfying conditional expression (3), various types of aberration can be effectively corrected over the entire zoom range without sacrificing the compactness of the optical system.

FIG. 1 is a cross sectional view (along the optical axis) of a zoom lens according to a first example. The zoom lens includes, sequentially from a non-depicted object side, a positive first lens group $G_{11}$, a negative second lens group $G_{12}$, a positive third lens group $G_{13}$, a positive fourth lens group $G_{14}$; a positive fifth lens group $G_{15}$, and a negative sixth $G_{16}$. Further, a diaphragm STP is disposed between the second lens group $G_{12}$ and the third lens group $G_{13}$. A cover glass CG (or filter) is disposed between the sixth lens group $G_{16}$ and an imaging plane IMG. The cover glass CG (or filter) is disposed as needed and may be omitted when not necessary. Further, at the imaging plane IMG, an optical receiving surface of an imaging element such as a CCD, a CMOS, etc. is disposed.

The first lens group $G_{11}$ includes, sequentially from the object side, a negative lens $L_{111}$, a positive lens $L_{112}$, a positive lens $L_{113}$, and a positive lens $L_{114}$. The negative lens $L_{111}$ and the positive lens $L_{112}$ are cemented together.

The second lens group $G_{12}$ includes, sequentially from the object side, a negative lens $L_{121}$, a negative lens $L_{122}$, a positive lens $L_{123}$, and a negative lens $L_{124}$. The negative lens $L_{122}$ and the positive lens $L_{123}$ are cemented together. Further, a surface on the object side of the negative lens $L_{121}$ is formed to be aspheric.

The third lens group $G_{13}$ includes, sequentially from the object side, a positive lens $L_{131}$ and a negative lens $L_{132}$ that are cemented together.

The fourth lens group $G_{14}$ includes, sequentially from the object side, a positive lens $L_{141}$, a positive lens $L_{142}$ and a negative lens $L_{143}$. A surface on the object side of the positive lens $L_{142}$ is aspheric. Further, the positive lens $L_{142}$ and the negative lens $L_{143}$ are cemented together.

The fifth lens group $G_{15}$ includes, sequentially from the object side, a positive lens $L_{151}$, a negative lens $L_{152}$, and a positive lens $L_{153}$. Both surfaces of the positive lens $L_{151}$ are aspheric. Further, the negative lens $L_{152}$ and the positive lens $L_{153}$ are cemented together.

The sixth lens group $G_{16}$ includes, sequentially from the object side, a negative lens $L_{161}$ and a positive lens $L_{162}$ that are cemented together.

The zoom lens zooms from the wide angle edge to the telephoto edge by moving the second lens group $G_{12}$, the third lens group $G_{13}$, and the fourth lens group $G_{14}$ along the optical axis. Furthermore, the zoom lens corrects imaging plane (image location) variation accompanying zoom and focuses the image, by moving the fifth lens group $G_{15}$ along the optical axis. The first lens group $G_{11}$ and the sixth lens group $G_{16}$ remain fixed.

Various values related to the zoom lens according to the first example are indicated below.

focal length of entire zoom lens=8.42 (wide angle edge) to 22.75 (intermediate zoom position) to 62.70 (telephoto edge)
F number=2.85
angle of view (2ω)=70.1° (wide angle edge) to 27.64° (intermediate zoom position) to 10.26° (telephoto edge)
(Values Related to Conditional Expression (1))
distance (SLW) from diaphragm STP at wide angle edge to imaging plane IMG=64.382
distance (SLM) from diaphragm STP at intermediate zoom position to imaging plane IMG=74.473
distance (SLT) from diaphragm STP at telephoto edge to imaging plane IMG=62.736
focal length (FW) of entire optical system for infinity at wide angle edge=8.42
(SLM−(SLW+SLT)/2)/FW=1.296
(Values Related to Conditional Expression (2))
F14t=−274.22
(Values Related to Conditional Expression (3))
deviation (S10) of paraxial curvature radius and aspheric shape at height that is 100% of effective diameter of aspheric surface on object side of lens that is farthest on object side in second lens group $G_{12}$=0.550
height (H) that is 100% of effective diameter of aspheric surface on object side of lens that is farthest on object side in second lens group $G_{12}$=29.700
S10/H=0.019
$r_1$=134.2328
$\quad d_1$=1.6500 $nd_1$=1.80610 $\upsilon d_1$=33.27
$r_2$=60.3060
$\quad d_2$=8.6001 $nd_2$=1.49700 $\upsilon d_2$=81.61

Figure 2:
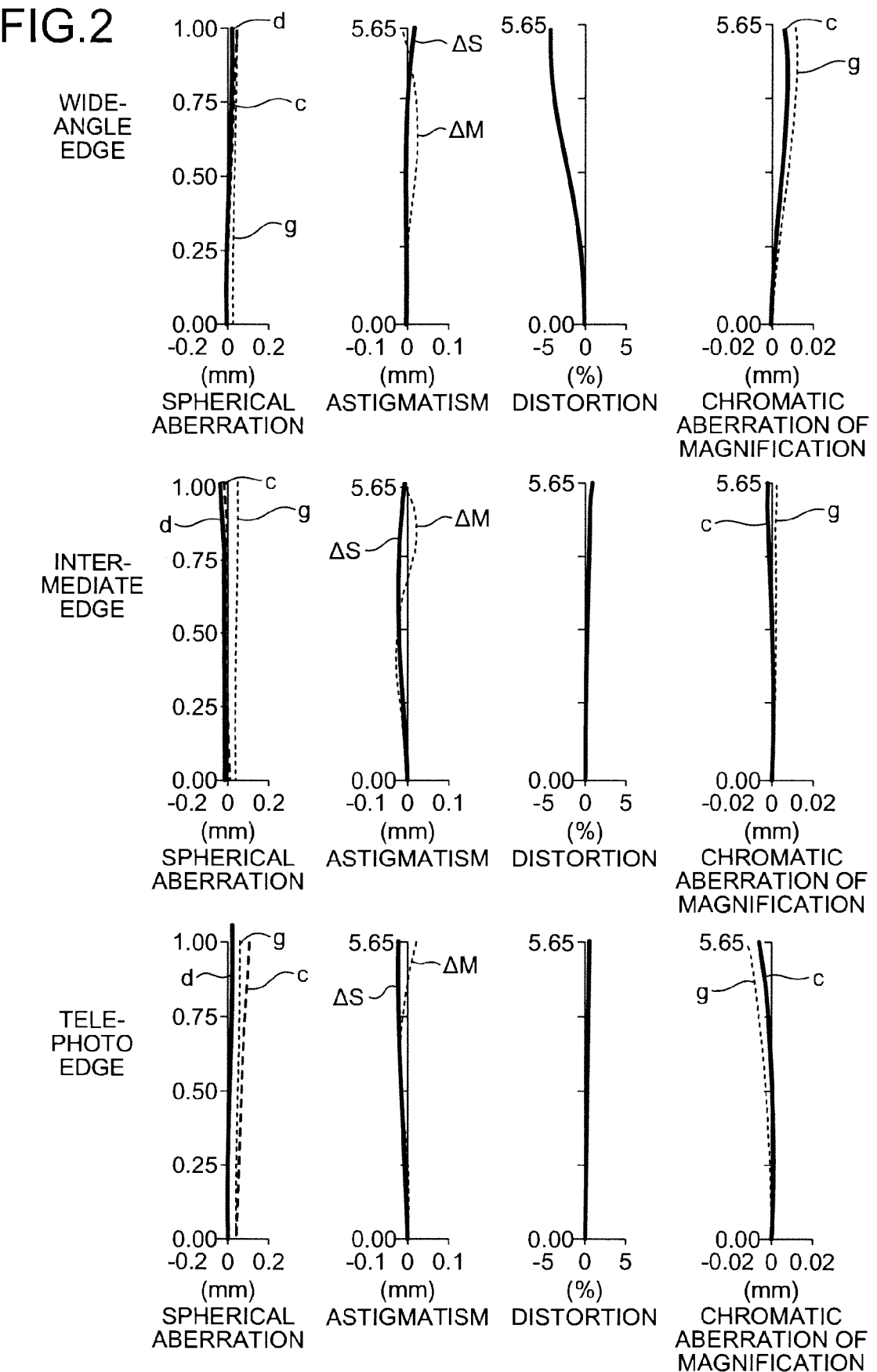
FIG. 2 is a diagram of various types of aberration of the zoom lens according to the first example.

$r_3=607.0146$
$d_3=0.1500$
$r_4=60.8304$
$d_4=6.2517$ $nd_3=1.49700$ $\upsilon d_3=81.61$
$r_5=281.3437$
$d_5=0.1500$
$r_6=63.3658$
$d_6=4.3249$ $nd_4=1.61800$ $\upsilon d_4=63.39$
$r_7=146.8250$
$d_7=0.9000$ (wide angle edge) to 25.4067 (intermediate zoom position) to 45.0224 (telephoto edge)
$r_8=309.6078$ (aspheric surface)
$d_8=0.3000$ $nd_5=1.53610$ $\upsilon d_5=41.00$
$r_9=149.0172$
$d_9=1.2000$ $nd_6=1.88300$ $\upsilon d_6=40.80$
$r_{10}=16.0674$
$d_{10}=7.6090$
$r_{11}=-26.6578$
$d_{11}=1.0000$ $nd_7=1.49700$ $\upsilon d_7=81.61$
$r_{12}=26.6578$
$d_{12}=5.4742$ $nd_8=1.90366$ $\upsilon d_8=31.31$
$r_{13}=-35.0742$
$d_{13}=1.2590$
$r_{14}=-22.9708$
$d_{14}=0.8000$ $nd_9=1.48749$ $\upsilon d_9=70.44$
$r_{15}=37.6804$
$d_{15}=45.9494$ (wide angle edge) to 11.3508 (intermediate zoom position) to 3.4718 (telephoto edge)
$r_{16}=\infty$ (diaphragm)
$d_{16}=3.2000$
$r_{17}=44.1399$
$d_{17}=3.0954$ $nd_{10}=1.61800$ $\upsilon d_{10}=63.39$
$r_{18}=-16.0964$
$d_{18}=0.8000$ $nd_{11}=1.56732$ $\upsilon d_{11}=42.84$
$r_{19}=81.5134$
$d_{19}=6.2937$ (wide angle edge) to 16.3856 (intermediate zoom position) to 4.6489 (telephoto edge)
$r_{20}=17.4600$
$d_{20}=2.5000$ $nd_{12}=1.84666$ $\upsilon d_{12}=23.78$
$r_{21}=57.9358$
$d_{21}=0.1500$
$r_{22}=27.8066$ (aspheric surface)
$d_{22}=2.4494$ $nd_{13}=1.61800$ $\upsilon d_{13}=63.39$
$r_{23}=-99.1785$
$d_{23}=0.8000$ $nd_{14}=1.90366$ $\upsilon d_{14}=31.31$
$r_{24}=15.9500$
$d_{24}=12.7128$ (wide angle edge) to 6.7148 (intermediate zoom position) to 5.8692 (telephoto edge)
$r_{25}=16.7429$ (aspheric surface)
$d_{25}=6.0463$ $nd_{15}=1.61800$ $\upsilon d_{15}=63.39$
$r_{26}=-31.9401$ (aspheric surface)
$d_{26}=0.1500$
$r_{27}=-86.2525$
$d_{27}=1.0000$ $nd_{16}=1.90366$ $\upsilon d_{16}=31.31$
$r_{28}=19.3000$
$d_{28}=6.8470$ $nd_{17}=1.45650$ $\upsilon d_{17}=90.27$
$r_{29}=-19.3000$
$d_{29}=8.2372$ (wide angle edge) to 14.2351 (intermediate zoom position) to 15.0808 (telephoto edge)
$r_{30}=-14.5534$
$d_{30}=0.8000$ $nd_{18}=1.80610$ $\upsilon d_{18}=33.27$
$r_{31}=75.8757$
$d_{31}=3.0000$ $nd_{19}=1.92286$ $\upsilon d_{19}=20.88$
$r_{32}=-19.9968$
$d_{32}=0.8000$
$r_{33}=\infty$
$d_{33}=1.0000$ $nd_{20}=1.51680$ $\upsilon d_{20}=64.20$
$r_{34}=\infty$
$d_{34}=4.4970$ (wide angle edge) to 4.5081 (intermediate zoom position) to 4.4907 (telephoto edge)
$r_{35}=\infty$ (imaging plane)
constant of cone (K) and aspheric coefficients (A, B, C, D)
(eighth plane)
$K=344.0097$,
$A=1.13202\times10^{-5}$, $B=-2.26973\times10^{-8}$,
$C=6.79562\times10^{-11}$, $D=-9.81657\times10^{-14}$
(twenty-second plane)
$K=-0.9482$,
$A=-5.12429\times10^{-6}$, $B=-1.21508\times10^{-7}$,
$C=1.69189\times10^{-9}$, $D=-9.91420\times10^{-12}$
(twenty-fifth plane)
$K=-0.1842$,
$A=-2.67312\times10^{-5}$, $B=1.32767\times10^{-7}$,
$C=-9.76063\times10^{-10}$, $D=-4.41242\times10^{-13}$
(twenty-sixth plane)
$K=0.0482$,
$A=3.21221\times10^{-5}$, $B=1.32020\times10^{-7}$,
$C=-1.61331\times10^{-9}$, $D=3.26315\times10^{-32}$ FIG. 2 is a diagram of various types of aberration of the zoom lens according to the first example. In the diagram "g", "d", and "c" respectively represent aberrations for wavelengths corresponding to g-line ($\lambda=435.83$ nm), d-line ($\lambda=587.56$ nm), and c-line ($\lambda=656.27$ nm). ΔS and ΔM, in a portion of FIG. 2 indicating astigmatism, represent aberration with respect to a sagittal image plane and a meridional image plane, respectively.

Figure 3:
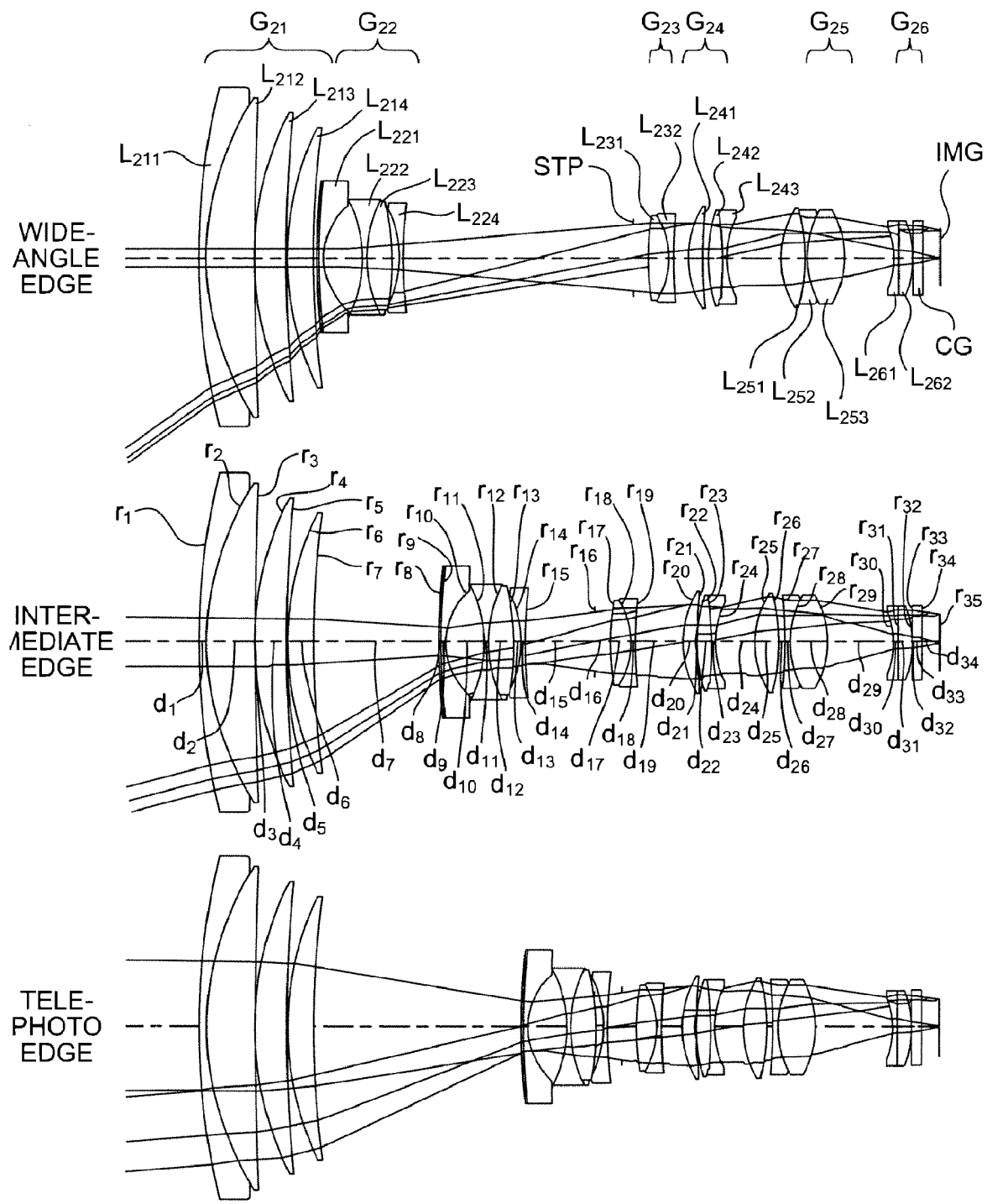
FIG. 3 is a cross sectional view (along the optical axis) of a zoom lens according to a second example.

FIG. 3 is a cross sectional view (along the optical axis) of a zoom lens according to a second example. The zoom lens includes, sequentially from the object side (not depicted), a positive first lens group $G_{21}$, a negative second lens group $G_{22}$, a positive third lens group $G_{23}$, a positive fourth lens group $G_{24}$, a positive fifth lens group $G_{25}$, and a negative sixth lens group $G_{26}$. Further, the diaphragm STP is disposed between the second lens group $G_{22}$ and the third lens group $G_{23}$. The cover glass CG (or filter) is disposed between the sixth lens group $G_{26}$ and the imaging plane IMG. The cover glass CG (or filter) is disposed as needed and may be omitted when not necessary. Further, at the imaging plane IMG, the optical receiving surface of an imaging element such as a CCD, a CMOS, etc. is disposed.

The first lens group $G_{21}$ includes, sequentially from the object side, a negative lens $L_{211}$, a positive lens $L_{212}$, a positive lens $L_{213}$, and a positive lens $L_{214}$. The negative lens $L_{211}$ and the positive lens $L_{212}$ are cemented together.

The second lens group $G_{22}$ includes, sequentially from the object side, a negative lens $L_{221}$, a negative lens $L_{222}$, a positive lens $L_{223}$, and a negative lens $L_{224}$. The negative lens $L_{222}$ and the positive lens $L_{223}$ are cemented together. Further, a surface on the object side of the negative lens $L_{221}$ is formed to be aspheric.

The third lens group $G_{23}$ includes, sequentially from the object side, a positive lens $L_{231}$ and a negative lens $L_{232}$ that are cemented together.

The fourth lens group $G_{24}$ includes, sequentially from the object side, a positive lens $L_{241}$, a positive lens $L_{242}$, and a negative lens $L_{243}$. A surface on the object side of the positive lens $L_{242}$ is aspheric. Further, the positive lens $L_{242}$ and the negative lens $L_{243}$ are cemented together.

The fifth lens group $G_{25}$ includes, sequentially from the object side, a positive lens $L_{251}$, a negative lens $L_{252}$, and a positive lens $L_{253}$. Both surfaces of the positive lens $L_{251}$ are aspheric. Further, the negative lens $L_{252}$ and the positive lens $L_{253}$ are cemented together.

The sixth lens group $G_{26}$ includes, sequentially from the object side, a negative lens $L_{261}$ and a positive lens $L_{262}$ that are cemented together.

The zoom lens zooms from the wide angle edge to the telephoto edge by moving the second lens group $G_{22}$, the third lens group $G_{23}$, and the fourth lens group $G_{24}$ along the optical axis. Furthermore, the zoom lens corrects imaging plane (image location) variation accompanying zoom and focuses the image, by moving the fifth lens group $G_{25}$ along the optical axis. The first lens group $G_{21}$ and the sixth lens group $G_{26}$ remain fixed.

Figure 4:
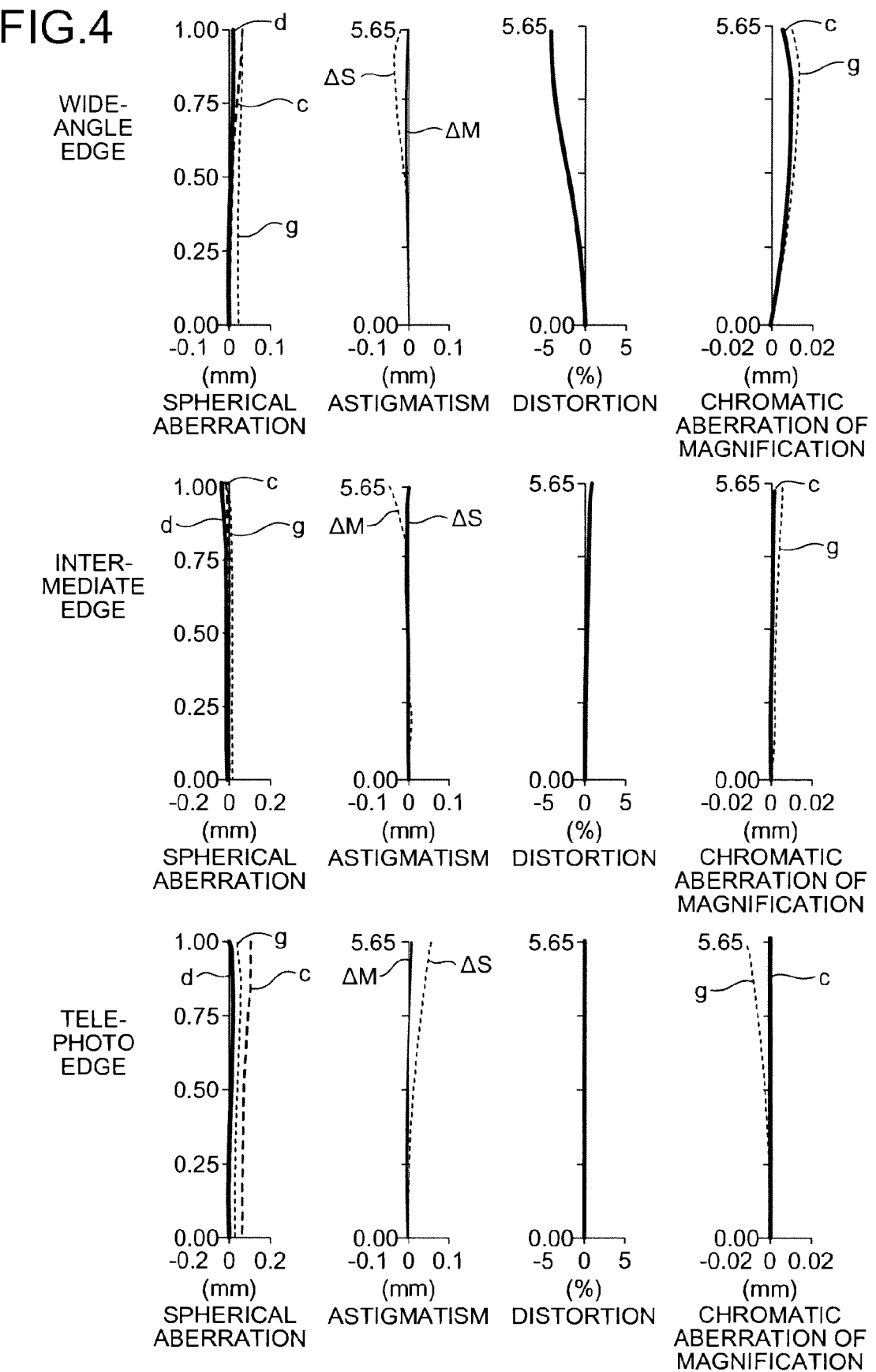
FIG. 4 is a diagram of various types of aberration of the zoom lens according to the second example.

Various values related to the zoom lens according to the second example are indicated below.

focal length of entire zoom lens=7.58 (wide angle edge) to 22.75 (intermediate zoom position) to 54.25 (telephoto edge)
F number=2.40
angle of view (2ω)=75.9° (wide angle edge) to 27.22° (intermediate zoom position) to 11.87° (telephoto edge)
(Values Related to Conditional Expression (1))
distance (SLW) from diaphragm STP at wide angle edge to imaging plane IMG=60.888
distance (SLM) from diaphragm STP at intermediate zoom position to imaging plane IMG=76.383
distance (SLT) from diaphragm STP at telephoto edge to imaging plane IMG=66.587
focal length (FW) of entire optical system for infinity at wide angle edge=7.58
(SLM−(SLW+SLT)/2)/FW=1.669
(Values Related to Conditional Expression (2))
F14t=−167.758
(Values Related to Conditional Expression (3))
deviation (S10) of paraxial curvature radius and aspheric shape at height that is 100% of effective diameter of aspheric surface on object side of lens that is farthest on object side in second lens group $G_{22}$=0.809
height (H) that is 100% of effective diameter of aspheric surface on object side of lens that is farthest on object side in second lens group $G_{22}$=31.300
S10/H=0.026
$r_1$=207.0000
  $d_1$=1.6000 $nd_1$=1.90366 $\upsilon d_1$=31.31
$r_2$=68.9000
  $d_2$=8.5664 $nd_2$=1.49700 $\upsilon d_2$=81.61
$r_3$=970.0000
  $d_3$=0.1500
$r_4$=74.8900
  $d_4$=6.1637 $nd_3$=1.49700 $\upsilon d_3$=81.61
$r_5$=370.0000
  $d_5$=0.1500
$r_6$=62.6000
  $d_6$=4.9877 $nd_4$=1.75700 $\upsilon d_4$=47.71
$r_7$=167.0000
  $d_7$=1.0000 (wide angle edge) to 30.0775 (intermediate zoom position) to 47.5000 (telephoto edge)
$r_8$=442.8586 (aspheric surface)
  $d_8$=0.2000 $nd_5$=1.53920 $\upsilon d_5$=41.21
$r_9$=103.6181
  $d_9$=1.0000 $nd_6$=1.88300 $\upsilon d_6$=40.80
$r_{10}$=15.0018
  $d_{10}$=9.0225
$r_{11}$=−24.0001
  $d_{11}$=0.7000 $nd_7$=1.49700 $\upsilon d_7$=81.61
$r_{12}$=38.3759
  $d_{12}$=5.7015 $nd_8$=1.90366 $\upsilon d_8$=31.31
$r_{13}$=−28.8899
  $d_{13}$=0.5664
$r_{14}$=−24.0930
  $d_{14}$=0.7000 $nd_9$=1.49700 $\upsilon d_9$=81.61
$r_{15}$=71.3234
  $d_{15}$=55.3046 (wide angle edge) to 10.7360 (intermediate zoom position) to 3.1168 (telephoto edge)
$r_{16}$=∞ (diaphragm)
  $d_{16}$=3.2000
$r_{17}$=44.5619
  $d_{17}$=4.2309 $nd_{10}$=1.61800 $\upsilon d_{10}$=63.39
$r_{18}$=−20.7679
  $d_{18}$=0.6000 $nd_{11}$=1.56732 $\upsilon d_{11}$=42.84
$r_{19}$=53.6764
  $d_{19}$=4.2562 (wide angle edge) to 13.7276 (intermediate zoom position) to 1.5000 (telephoto edge)
$r_{20}$=19.4936
  $d_{20}$=2.7141 $nd_{12}$=1.84666 $\upsilon d_{12}$=23.78
$r_{21}$=46.1822
  $d_{21}$=1.4399
$r_{22}$=20.7222 (aspheric surface)
  $d_{22}$=3.0000 $nd_{13}$=1.61800 $\upsilon d_{13}$=63.39
$r_{23}$=629.2796
  $d_{23}$=0.6000 $nd_{14}$=1.90366 $\upsilon d_{14}$=31.31
$r_{24}$=16.2600
  $d_{24}$=7.7197 (wide angle edge) to 6.9446 (intermediate zoom position) to 5.8651 (telephoto edge)
$r_{25}$=17.1547 (aspheric surface)
  $d_{25}$=5.0000 $nd_{15}$=1.61800 $\upsilon d_{15}$=63.39
$r_{26}$=−44.7408 (aspheric surface)
  $d_{26}$=0.1502
$r_{27}$=−125.5194
  $d_{27}$=1.0000 $nd_{16}$=1.90366 $\upsilon d_{16}$=31.31
$r_{28}$=20.1000
  $d_{28}$=8.0000 $nd_{17}$=1.45650 $\upsilon d_{17}$=90.27
$r_{29}$=−20.1000
  $d_{29}$=8.2228 (wide angle edge) to 15.0177 (intermediate zoom position) to 18.5215 (telephoto edge)
$r_{30}$=−18.3070
  $d_{30}$=0.6000 $nd_{18}$=1.80610 $\upsilon d_{18}$=33.27
$r_{31}$=78.3700
  $d_{31}$=2.1531 $nd_{19}$=1.92286 $\upsilon d_{19}$=20.88
$r_{32}$=−25.6495
  $d_{32}$=0.8000
$r_{33}$=∞
  $d_{33}$=2.2000 $nd_{20}$=1.51680 $\upsilon d_{20}$=64.20
$r_{34}$=∞
  $d_{34}$=5.0014 (wide angle edge) to 5.0169 (intermediate zoom position) to 4.9946 (telephoto edge)
$r_{35}$=∞ (imaging plane)
constant of cone (K) and aspheric coefficients (A, B, C, D)
(eighth plane)
K=−16.9314,
A=1.77203×10$^{-5}$, B=−1.88816×10$^{-8}$,
C=−1.37289×10$^{-11}$, D=8.40961×10$^{-14}$
(twenty-second plane)
K=−0.4655,
A=−1.30488×10$^{-6}$, B=−7.35853×10$^{-8}$,
C=4.47932×10$^{-10}$, D=−1.92734×10$^{-12}$
(twenty-fifth plane)
K=−0.1215,
A=−2.29865×10$^{-5}$, B=1.22648×10$^{-7}$,
C=−9.70568×10$^{-10}$, D=1.17703×10$^{-11}$
(twenty-sixth plane)
K=0.7178,
A=3.15598×10$^{-5}$, B=7.93060×10$^{-8}$,
C=−7.35002×10$^{-10}$, D=1.18983×10$^{-11}$ FIG. 4 is a diagram of various types of aberration of the zoom lens according to the second example. In the diagram "g", "d", and "c" respectively represent aberrations for wavelengths corresponding to g-line (λ=435.83 nm), d-line (λ=587.56 nm), and c-line (λ=656.27 nm). ΔS and ΔM, in a portion of FIG. 4 indicating astigmatism, represent aberration with respect to the sagittal image plane and the meridional image plane, respectively.

Figure 5:
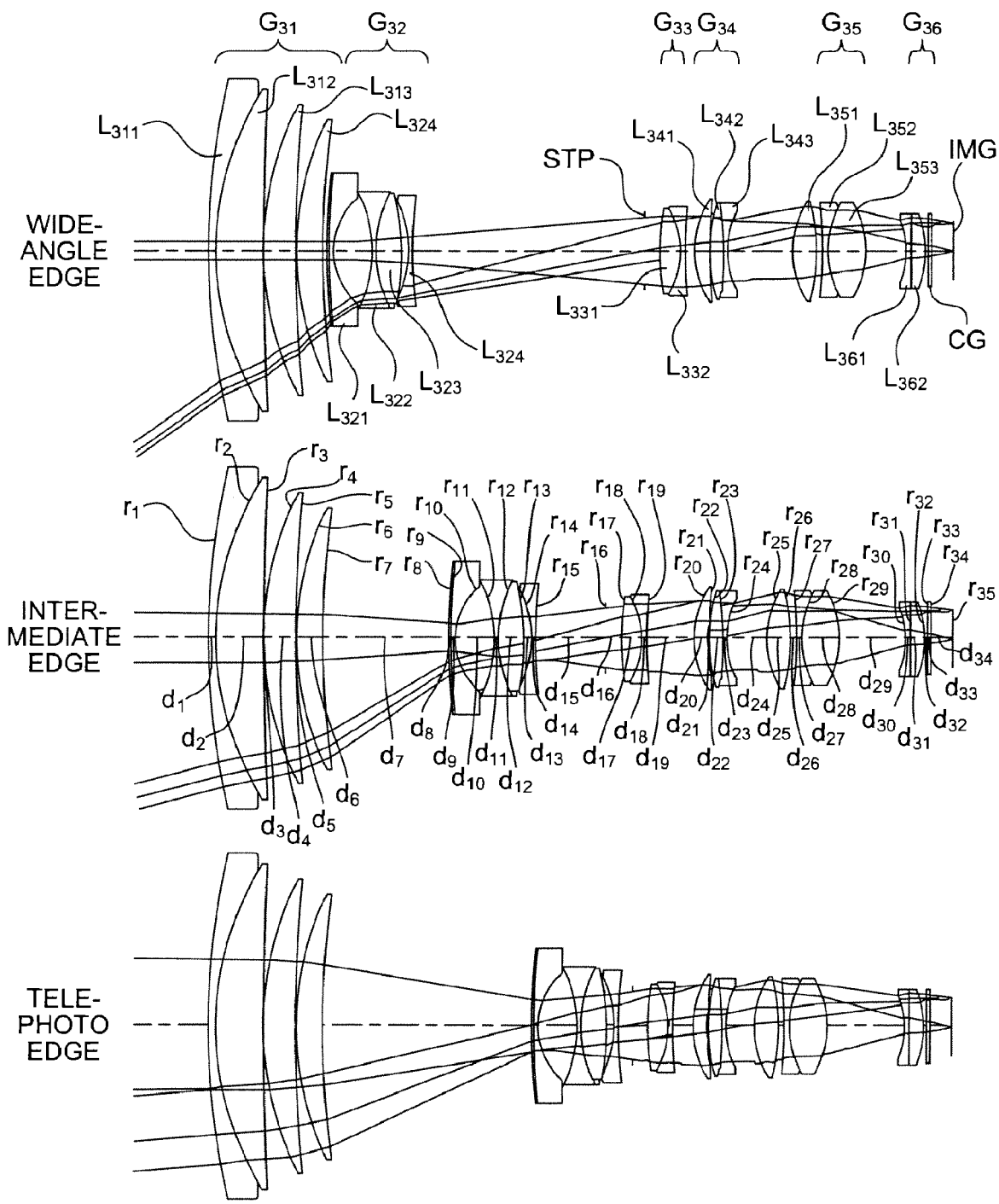
FIG. 5 is a cross sectional view (along the optical axis) of a zoom lens according to a third example.

FIG. 5 is a cross sectional view (along the optical axis) of a zoom lens according to a third example. The zoom lens includes, sequentially from the object side (not depicted), a positive first lens group $G_{31}$, a negative second lens group $G_{32}$, a positive third lens group $G_{33}$, a positive fourth lens group $G_{34}$, a positive fifth lens group $G_{35}$, and a negative sixth lens group $G_{36}$. Further, the diaphragm STP is disposed between the second lens group $G_{32}$ and the third lens group $G_{33}$. The cover glass CG (or filter) is disposed between the sixth lens group $G_{36}$ and the imaging plane IMG. The cover glass CG (or filter) is disposed as needed and may be omitted when not necessary. Further, at the imaging plane IMG, the optical receiving surface of an imaging element such as a CCD, a CMOS, etc. is disposed.

The first lens group $G_{31}$ includes, sequentially from the object side, a negative lens $L_{311}$, a positive lens $L_{312}$, a positive lens $L_{313}$, and a positive lens $L_{314}$. The negative lens $L_{311}$ and the positive lens $L_{312}$ are cemented together.

The second lens group $G_{32}$ includes, sequentially from the object side, a negative lens $L_{321}$, a negative lens $L_{322}$, a positive lens $L_{323}$, and a negative lens $L_{324}$. The negative lens $L_{322}$ and the positive lens $L_{323}$ are cemented together. Further, a surface on the object side of the negative lens $L_{321}$ is formed to be aspheric.

The third lens group $G_{33}$ includes, sequentially from the object side, a positive lens $L_{331}$ and a negative lens $L_{332}$ that are cemented together.

The fourth lens group $G_{34}$ includes, sequentially from the object side, a positive lens $L_{341}$, a positive lens $L_{342}$, and a negative lens $L_{343}$. A surface on the object side of the positive lens $L_{342}$ is aspheric. Further, the positive lens $L_{342}$ and the negative lens $L_{343}$ are cemented together.

The fifth lens group $G_{35}$ includes, sequentially from the object side, a positive lens $L_{351}$, a negative lens $L_{352}$, and a positive lens $L_{353}$. Both surfaces of the positive lens $L_{351}$ are aspheric. Further, the negative lens $L_{352}$ and the positive lens $L_{353}$ are cemented together.

The sixth lens group $G_{36}$ includes, sequentially from the object side, a negative lens $L_{361}$ and a positive lens $L_{362}$ that are cemented together.

The zoom lens zooms from the wide angle edge to the telephoto edge by moving the second lens group $G_{32}$, the third lens group $G_{33}$, and the fourth lens group $G_{34}$ along the optical axis. Furthermore, the zoom lens corrects imaging plane (image location) variation accompanying zoom and focuses the image, by moving the fifth lens group $G_{35}$ along the optical axis. The first lens group $G_{31}$ and the sixth lens group $G_{36}$ remain fixed.

Various values related to the zoom lens according to the third example are indicated below.

focal length of entire zoom lens=8.35 (wide angle edge) to 22.75 (intermediate zoom position) to 60.1 (telephoto edge)
F number=2.25
angle of view (2ω)=70.53° (wide angle edge) to 27.68° (intermediate zoom position) to 10.70° (telephoto edge)
(Values Related to Conditional Expression (1))
distance (SLW) from diaphragm STP at wide angle edge to imaging plane IMG=63.719
distance (SLM) from diaphragm STP at intermediate zoom position to imaging plane IMG=71.544
distance (SLT) from diaphragm STP at telephoto edge to imaging plane IMG=65.961
focal length (FW) of entire optical system for infinity at wide angle edge=8.35
(SLM−(SLW+SLT)/2)/FW=0.803
(Values Related to Conditional Expression (2))
F14t=−213.922
(Values Related to Conditional Expression (3))
deviation (S10) of paraxial curvature radius and aspheric shape at height that is 100% of effective diameter of aspheric surface on object side of lens that is farthest on object side in second lens group $G_{32}$=0.571
height (H) that is 100% of effective diameter of aspheric surface on object side of lens that is farthest on object side in second lens group $G_{32}$=29.500
S10/H=0.019
$r_1$=148.6615
   $d_1$=1.6500 $nd_1$=1.80610 $\upsilon d_1$=33.27
$r_2$=61.1938
   $d_2$=9.6601 $nd_2$=1.49700 $\upsilon d_2$=81.61
$r_3$=674.9250
   $d_3$=0.1500
$r_4$=64.5400
   $d_4$=6.4576 $nd_3$=1.49700 $\upsilon d_3$=81.61
$r_5$=257.1029
   $d_5$=0.1500
$r_6$=59.8878
   $d_6$=5.3883 $nd_4$=1.61800 $\upsilon d_4$=63.39
$r_7$=167.5508
   $d_7$=0.9000 (wide angle edge) to 26.2588 (intermediate zoom position) to 43.4318 (telephoto edge)
$r_8$=306.7263 (aspheric surface)
   $d_8$=0.2500 $nd_5$=1.53610 $\upsilon d_5$=41.00
$r_9$=108.4733
   $d_9$=1.2000 $nd_6$=1.88300 $\upsilon d_6$=40.80
$r_{10}$=14.5265
   $d_{10}$=7.8961
$r_{11}$=−25.8103
   $d_{11}$=1.0000 $nd_7$=1.49700 $\upsilon d_7$=81.61
$r_{12}$=25.8103
   $d_{12}$=5.2867 $nd_8$=1.90366 $\upsilon d_8$=31.31
$r_{13}$=−39.5598
   $d_{13}$=1.3138
$r_{14}$=−24.5665
   $d_{14}$=0.8000 $nd_9$=1.48749 $\upsilon d_9$=70.44
$r_{15}$=62.0539
   $d_{15}$=47.7845 (wide angle edge) to 14.5972 (intermediate zoom position) to 3.0080 (telephoto edge)
$r_{16}$=∞ (diaphragm)
   $d_{16}$=3.2000
$r_{17}$=49.1025
   $d_{17}$=4.3624 $nd_{10}$=1.61800 $\upsilon d_{10}$=63.39
$r_{18}$=−16.3370
   $d_{18}$=0.8000 $nd_{11}$=1.56732 $\upsilon d_{11}$=42.84
$r_{19}$=66.0271
   $d_{19}$=1.9335 (wide angle edge) to 9.7620 (intermediate zoom position) to 4.1799 (telephoto edge)
$r_{20}$=19.0834
   $d_{20}$=2.9583 $nd_{12}$=1.84666 $\upsilon d_{12}$=23.78
$r_{21}$=68.4183
   $d_{21}$=0.1500
$r_{22}$=28.8247 (aspheric surface)
   $d_{22}$=2.8694 $nd_{13}$=1.61800 $\upsilon d_{13}$=63.39
$r_{23}$=−100.6680
   $d_{23}$=0.8000 $nd_{14}$=1.90366 $\upsilon d_{14}$=31.31

Figure 6:
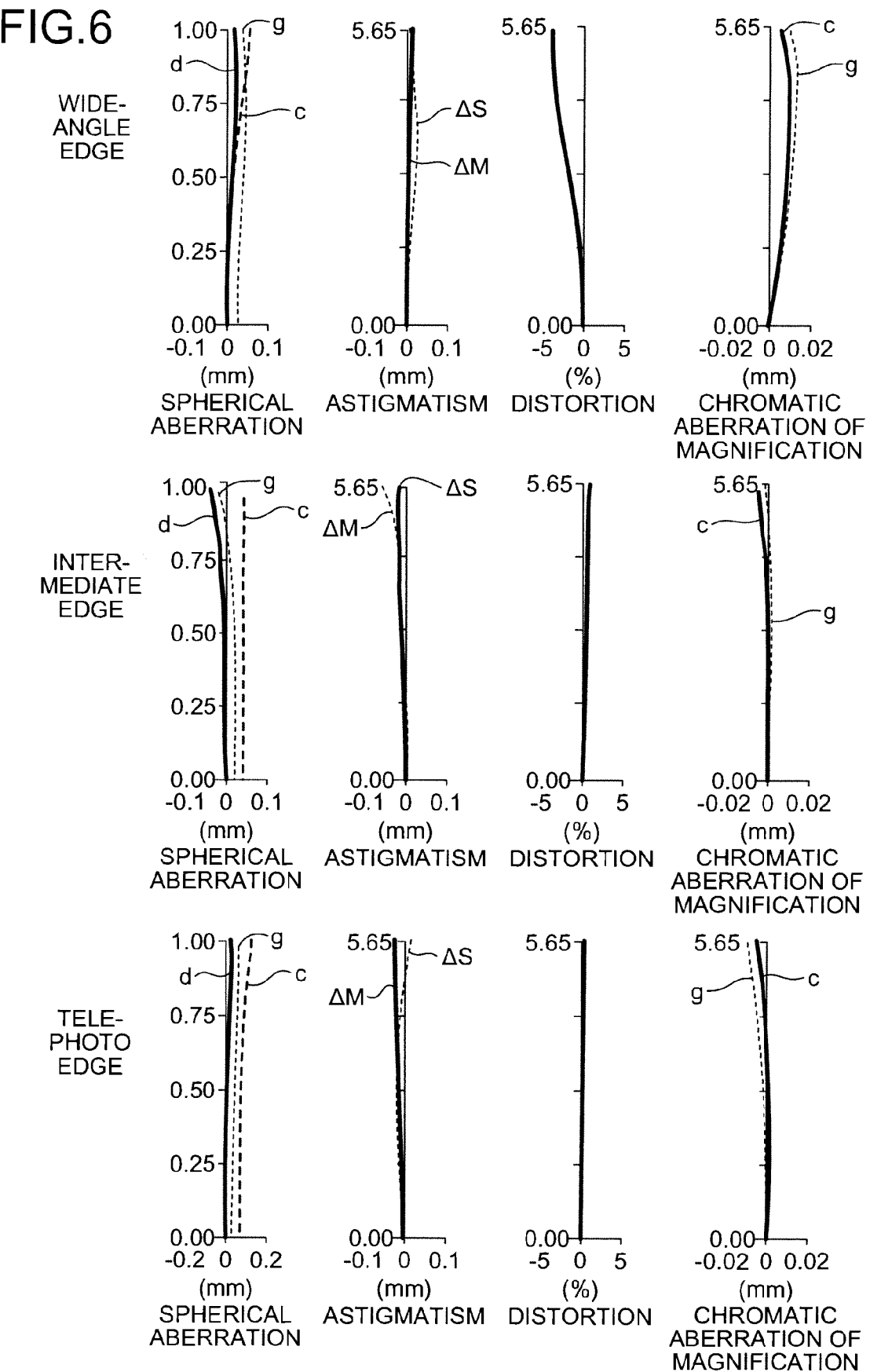
FIG. 6 is a diagram of various types of aberration of the zoom lens according to the third example.

$r_{24}$=17.4858
$\quad d_{24}$=13.3625 (wide angle edge) to 8.0360 (intermediate zoom position) to 5.8027 (telephoto edge)
$r_{25}$=17.5351 (aspheric surface)
$\quad d_{25}$=5.0724 $nd_{15}$=1.61800 $\upsilon d_{15}$=63.39
$r_{26}$=−33.4907 (aspheric surface)
$\quad d_{26}$=1.2961
$r_{27}$=−97.1180
$\quad d_{27}$=1.0000 $nd_{16}$=1.90366 $\upsilon d_{16}$=31.31
$r_{28}$=18.8323
$\quad d_{28}$=7.7198 $nd_{17}$=1.45650 $\upsilon d_{17}$=90.27
$r_{29}$=−18.8323
$\quad d_{29}$=8.3857 (wide angle edge) to 13.7122 (intermediate zoom position) to 15.9455 (telephoto edge)
$r_{30}$=−14.8301
$\quad d_{30}$=0.8000 $nd_{18}$=1.80610 $\upsilon d_{18}$=33.27
$r_{31}$=875.2519
$\quad d_{31}$=3.0000 $nd_{19}$=1.92286 $\upsilon d_{19}$=20.88
$r_{32}$=−19.0866
$\quad d_{32}$=0.5000
$r_{33}$=∞
$\quad d_{33}$=1.0000 $nd_{20}$=1.51680 $\upsilon d_{20}$=64.20
$r_{34}$=∞
$\quad d_{34}$=4.4800 (wide angle edge) to 4.5124 (intermediate zoom position) to 4.4780 (telephoto edge)
$r_{35}$=∞ (imaging plane)
constant of cone (K) and aspheric coefficients (A, B, C, D)
(eighth plane)
K=326.5969,
A=1.45864×10$^{-5}$, B=−3.27413×10$^{-8}$,
C=8.21551×10$^{-11}$, D=−1.78052×10$^{-13}$
(twenty-second plane)
K=−1.0471,
A=−6.42643×10$^{-6}$, B=−5.52441×10$^{-8}$,
C=4.13340×10$^{-10}$, D=−1.57709×10$^{-12}$
(twenty-fifth plane)
K=−0.1413,
A=−2.40303×10$^{-5}$, B=1.28161×10$^{-7}$,
C=−1.08450×10$^{-9}$, D=3.69783×10$^{-12}$
(twenty-sixth plane)
K=0.1817,
A=3.28626×10$^{-5}$, B=1.15663×10$^{-7}$,
C=−1.39748×10$^{-9}$, D=5.65410×10$^{-12}$ FIG. 6 is a diagram of various types of aberration of the zoom lens according to the third example. In the diagram "g", "d", and "c" respectively represent aberrations for wavelengths corresponding to g-line (λ=435.83 nm), d-line (λ=587.56 nm), and c-line (λ=656.27 nm). ΔS and ΔM, in a portion of FIG. 6 indicating astigmatism, represent aberration with respect to the sagittal image plane and the meridional image plane, respectively.

Figure 7:
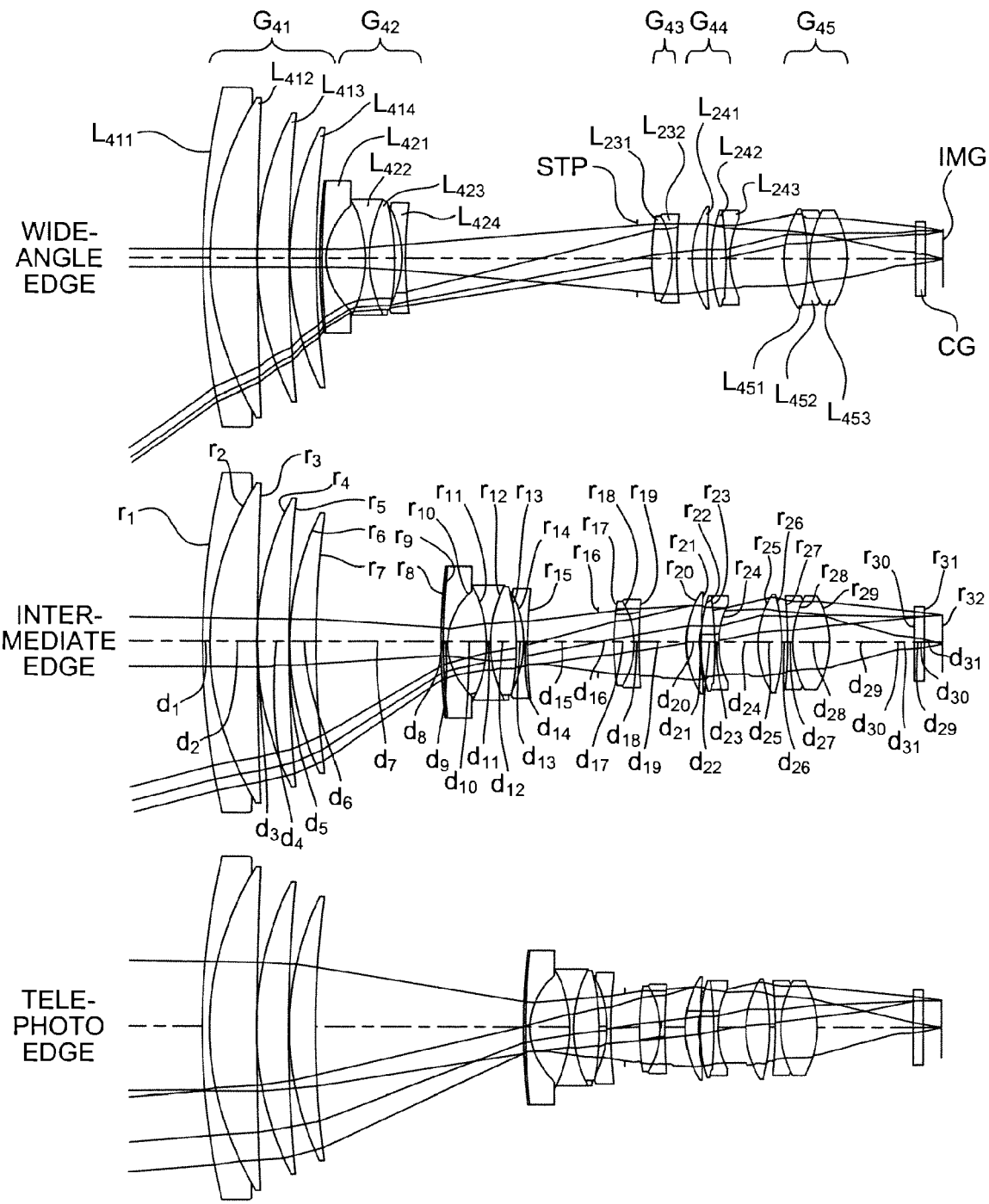
FIG. 7 is a cross sectional view (along the optical axis) of a zoom lens according to a fourth example.

FIG. 7 is a cross sectional view (along the optical axis) of a zoom lens according to a fourth example. The zoom lens includes, sequentially from the object side (not depicted), a positive first lens group $G_{41}$, a negative second lens group $G_{42}$, a positive third lens group $G_{43}$, a positive fourth lens group $G_{44}$, and a positive fifth lens group $G_{45}$. Further, the diaphragm STP is disposed between the second lens group $G_{42}$ and the third lens group $G_{43}$. The cover glass CG (or filter) is disposed between the fifth lens group $G_{45}$ and the imaging plane IMG. The cover glass CG (or filter) is disposed as needed and may be omitted when not necessary. Further, at the imaging plane IMG, the optical receiving surface of an imaging element such as a CCD, a CMOS, etc. is disposed.

The first lens group $G_{41}$ includes, sequentially from the object side, a negative lens $L_{411}$, a positive lens $L_{412}$, a positive lens $L_{413}$, and a positive lens $L_{414}$. The negative lens $L_{411}$ and the positive lens $L_{412}$ are cemented together.

The second lens group $G_{42}$ includes, sequentially from the object side, a negative lens $L_{421}$, a negative lens $L_{422}$, a positive lens $L_{423}$, and a negative lens $L_{424}$. The positive lens $L_{423}$ and the negative lens $L_{424}$ are cemented together. Further, a surface on the object side of the negative lens $L_{421}$ is aspheric.

The third lens group $G_{43}$ includes, sequentially from the object side, a positive lens $L_{431}$ and a negative lens $L_{432}$ that are cemented together.

The fourth lens group $G_{44}$ includes, sequentially from the object side, a positive lens $L_{441}$, a positive lens $L_{442}$, and a negative lens $L_{443}$. A surface on the object side of the positive lens $L_{442}$ is aspheric. Further, the positive lens $L_{442}$ and the negative lens $L_{443}$ are cemented together.

The fifth lens group $G_{45}$ includes, sequentially from the object side, a positive lens $L_{451}$, a negative lens $L_{452}$, and a positive lens $L_{453}$. Both surfaces of the positive lens $L_{451}$ are aspheric. Further, the negative lens $L_{452}$ and the positive lens $L_{453}$ are cemented together.

The zoom lens zooms from the wide angle edge to the telephoto edge by moving the second lens group $G_{42}$ and the fourth lens group $G_{44}$ along the optical axis. At this time, the diaphragm STP is also moved. Furthermore, the zoom lens corrects imaging plane (image location) variation accompanying zoom and focuses the image, by moving the fifth lens group $G_{45}$ along the optical axis. The first lens group $G_{41}$ and the third lens group $G_{43}$ remain fixed.

Various values related to the zoom lens according to the fourth example are indicated below.
focal length of entire zoom lens=8.14 (wide angle edge) to 22.75 (intermediate zoom position) to 60.60 (telephoto edge) F number=2.85
angle of view (2ω)=72.42° (wide angle edge) to 27.47° (intermediate zoom position) to 10.66° (telephoto edge)
(Values Related to Conditional Expression (1))
distance (SLW) from diaphragm STP at wide angle edge to imaging plane IMG=58.376
distance (SLM) from diaphragm STP at intermediate zoom position to imaging plane IMG=65.379
distance (SLT) from diaphragm STP at telephoto edge to imaging plane IMG=58.356
focal length (FW) of entire optical system for infinity at wide angle edge=8.14
(SLM−(SLW+SLT)/2)/FW=0.861
(Values Related to Conditional Expression (2))
F14t=−218.45
(Values Related to Conditional Expression (3))
deviation (S10) of paraxial curvature radius and aspheric shape at height that is 100% of effective diameter of aspheric surface on object side of lens that is farthest on object side in second lens group $G_{42}$=0.307
height (H) that is 100% of effective diameter of aspheric surface on object side of lens that is farthest on object side in second lens group $G_{42}$=27.420
S10/H=0.011
$r_1$=319.7966
$\quad d_1$=1.6500 $nd_1$=1.90366 $\upsilon d_1$=31.31
$r_2$=72.5656
$\quad d_2$=10.7848 $nd_2$=1.49700 $\upsilon d_2$=81.61
$r_3$=−311.7970
$\quad d_3$=0.1497
$r_4$=64.5319
$\quad d_4$=7.9428 $nd_3$=1.49700 $\upsilon d_3$=81.61
$r_5$=517.6623
$\quad d_5$=0.1504

Figure 8:
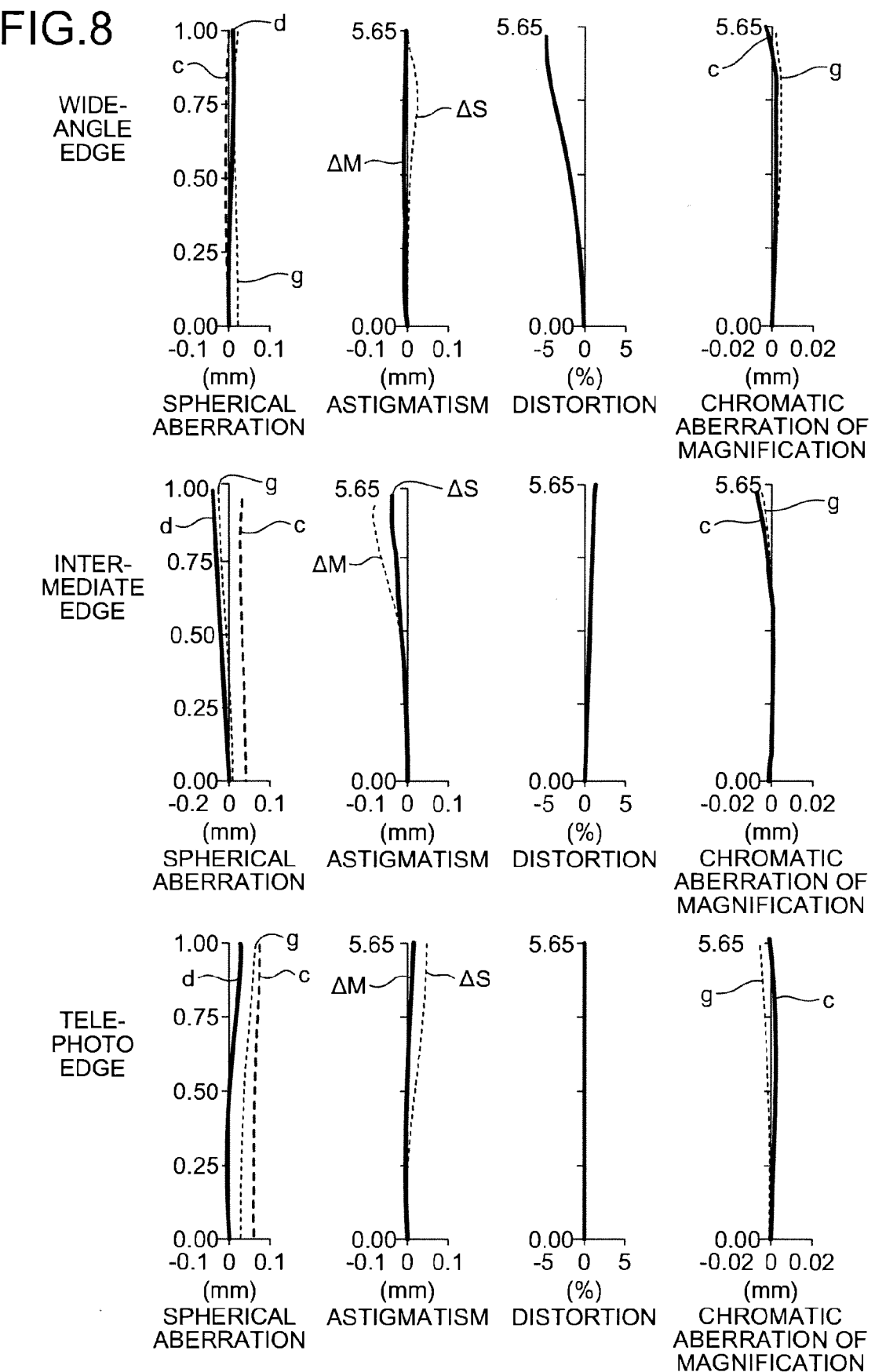
FIG. 8 is a diagram of various types of aberration of the zoom lens according to the fourth example.

$r_6=62.9561$
  $d_6=4.8145$ $nd_4=1.83481$ $\upsilon d_4=42.72$
$r_7=125.2065$
  $d_7=1.0515$ (wide angle edge) to 28.3835 (intermediate zoom position) to 46.0511 (telephoto edge)
$r_8=202.1496$ (aspheric surface)
  $d_8=0.3000$ $nd_5=1.53610$ $\upsilon d_5=41.20$
$r_9=158.8874$
  $d_9=1.2000$ $nd_6=1.88300$ $\upsilon d_6=40.80$
$r_{10}=13.6525$
  $d_{10}=7.7684$
$r_{11}=-22.2902$
  $d_{11}=0.8000$ $nd_7=1.49700$ $\upsilon d_7=81.61$
$r_{12}=28.9611$
  $d_{12}=1.8315$
$r_{13}=34.0302$
  $d_{13}=5.2187$ $nd_8=1.88300$ $\upsilon d_8=40.80$
$r_{14}=-27.8585$
  $d_{14}=0.7997$ $nd_9=1.49700$ $\upsilon d_9=81.61$
$r_{15}=85.7544$
  $d_{15}=47.1745$ (wide angle edge) to 12.8409 (intermediate zoom position) to 2.1755 (telephoto edge)
$r_{16}=\infty$ (diaphragm)
  $d_{16}=3.0013$ (wide angle edge) to 10.0026 (intermediate zoom position) to 3.0001 (telephoto edge)
$r_{17}=48.7738$
  $d_{17}=1.4336$ $nd_{10}=1.72916$ $\upsilon d_{10}=54.67$
$r_{18}=-150.0000$
  $d_{18}=0.8000$ $nd_{11}=1.64769$ $\upsilon d_{11}=33.84$
$r_{19}=52.3545$
  $d_{19}=5.1946$ (wide angle edge) to 3.0000 (intermediate zoom position) to 2.00334 (telephoto edge)
$r_{20}=16.0966$
  $d_{20}=2.1227$ $nd_{12}=1.84666$ $\upsilon d_{12}=23.78$
$r_{21}=51.9417$
  $d_{21}=0.1500$
$r_{22}=20.9928$ (aspheric surface)
  $d_{22}=3.0358$ $nd_{13}=1.61800$ $\upsilon d_{13}=63.39$
$r_{23}=-54.8038$
  $d_{23}=1.4774$ $nd_{14}=1.90366$ $\upsilon d_{14}=31.31$
$r_{24}=12.8327$
  $d_{24}=8.0538$ (wide angle edge) to 6.4772 (intermediate zoom position) to 7.0282 (telephoto edge)
$r_{25}=16.9803$ (aspheric surface)
  $d_{25}=4.8893$ $nd_{15}=1.61800$ $\upsilon d_{15}=63.39$
$r_{26}=-38.2034$ (aspheric surface)
  $d_{26}=0.1499$
$r_{27}=-101.4054$
  $d_{27}=0.8000$ $nd_{16}=1.90366$ $\upsilon d_{16}=31.31$
$r_{28}=22.1937$
  $d_{28}=7.0000$ $nd_{17}=1.45650$ $\upsilon d_{17}=90.27$
$r_{29}=-19.4717$
  $d_{29}=13.2585$ (wide angle edge) to 17.0370 (intermediate zoom position) to 17.4265 (telephoto edge)
$r_{30}=\infty$
  $d_{30}=2.0000$ $nd_{18}=1.51680$ $\upsilon d_{18}=64.20$
$r_{31}=\infty$
  $d_{31}=5.0092$ (wide angle edge) to 5.0029 (intermediate zoom position) to 5.0090 (telephoto edge)
$r_{32}=\infty$ (imaging plane)
constant of cone (K) and aspheric coefficients (A, B, C, D)
(eighth plane)
K=−475.5474,
A=2.30384×10$^{-5}$, B=−9.02107×10$^{-8}$,
C=2.44012×10$^{-10}$, D=−3.43957×10$^{-13}$ (twenty-second plane)
K=−0.1382,
A=3.54823×10$^{-6}$, B=−7.49188×10$^{-8}$,
C=1.47759×10$^{-9}$, D=−1.06171×10$^{-11}$
(twenty-fifth plane)
K=−0.2034,
A=−2.79047×10$^{-5}$, B=9.40720×10$^{-8}$,
C=−2.20786×10$^{-9}$, D=1.32509×10$^{-11}$
(twenty-sixth plane)
K=−0.7196,
A=3.44659×10$^{-5}$, B=−1.31505×10$^{-8}$,
C=−1.47468×10$^{-9}$, D=1.07727×10$^{-11}$ FIG. 8 is a diagram of various types of aberration of the zoom lens according to the fourth example. In the diagram "g", "d", and "c" respectively represent aberrations for wavelengths corresponding to g-line ($\lambda$=435.83 nm), d-line ($\lambda$=587.56 nm), and c-line ($\lambda$=656.27 nm). ΔS and ΔM, in a portion of FIG. 8 indicating astigmatism, represent aberration with respect to the sagittal image plane and the meridional image plane, respectively.

Figure 9:
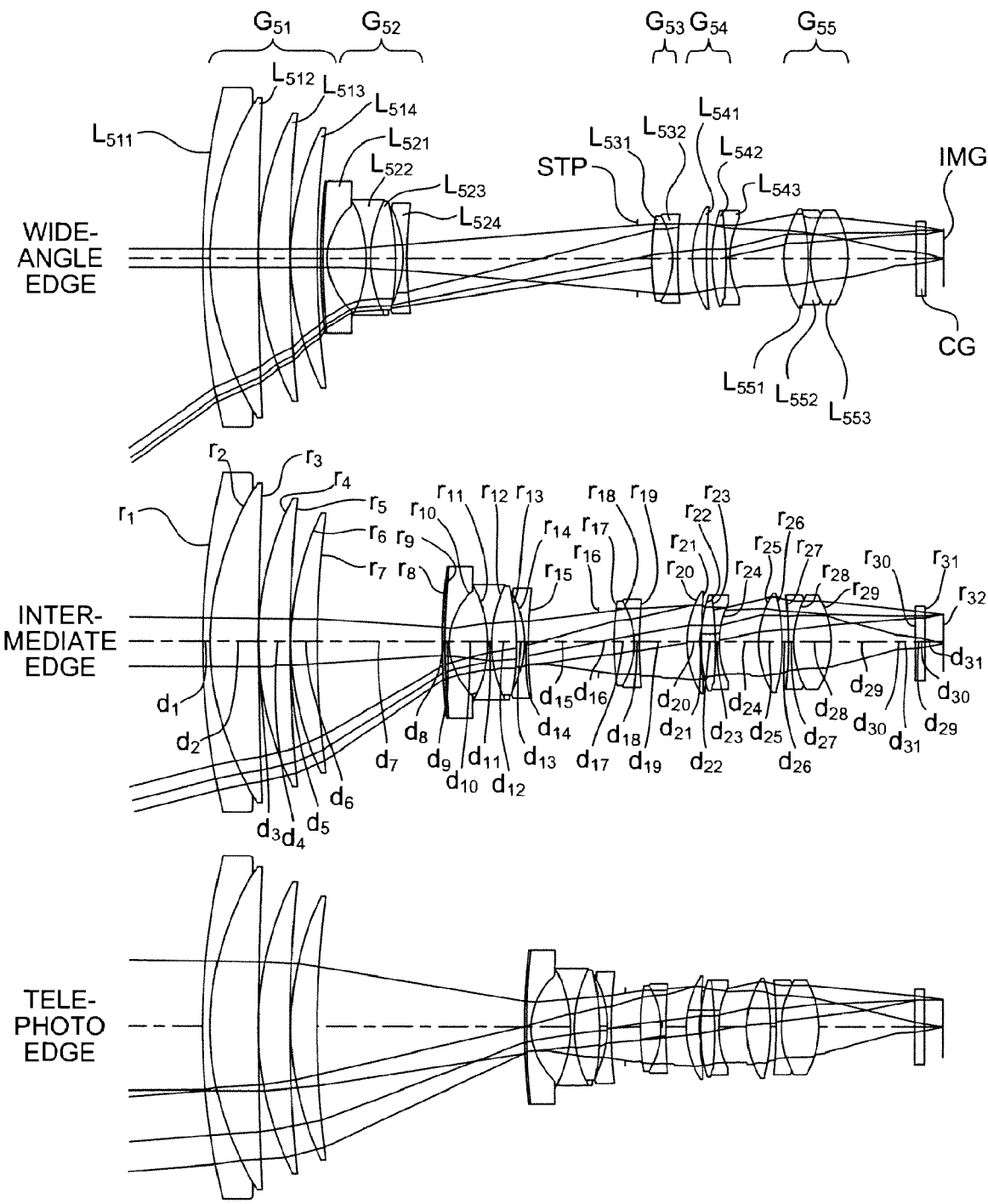
FIG. 9 is a cross sectional view (along the optical axis) of a zoom lens according to a fifth example.

FIG. 9 is a cross sectional view (along the optical axis) of a zoom lens according to a fifth example. The zoom lens includes, sequentially from the object side (not depicted), a positive first lens group $G_{51}$, a negative second lens group $G_{52}$, a positive third lens group $G_{53}$, a positive fourth lens group $G_{54}$, and a positive fifth lens group $G_{55}$. Further, the diaphragm STP is disposed between the second lens group $G_{52}$ and the third lens group $G_{53}$. The cover glass CG (or filter) is disposed between the fifth lens group $G_{55}$ and the imaging plane IMG. The cover glass CG (or filter) is disposed as needed and may be omitted when not necessary. Further, at the imaging plane IMG, the optical receiving surface of an imaging element such as a CCD, a CMOS, etc. is disposed.

The first lens group $G_{51}$ includes, sequentially from the object side, a negative lens $L_{511}$, a positive lens $L_{512}$, a positive lens $L_{513}$, and a positive lens $L_{514}$. The negative lens $L_{511}$ and the positive lens $L_{512}$ are cemented together.

The second lens group $G_{52}$ includes, sequentially from the object side, a negative lens $L_{521}$, a negative lens $L_{522}$, a positive lens $L_{523}$, and a negative lens $L_{524}$. The positive lens $L_{523}$ and the negative lens $L_{524}$ are cemented together. Further, a surface on the object side of the negative lens $L_{521}$ is aspheric.

The third lens group $G_{53}$ includes, sequentially from the object side, a positive lens $L_{531}$ and a negative lens $L_{532}$ that are cemented together.

The fourth lens group $G_{54}$ includes, sequentially from the object side, a positive $L_{541}$, a positive lens $L_{542}$, and a negative lens $L_{543}$. A surface on the object side of the positive lens $L_{542}$ is aspheric. Further, the positive lens $L_{542}$ and the negative lens $L_{543}$ are cemented together.

The fifth lens group $G_{55}$ includes, sequentially from the object side, a positive lens $L_{551}$, a negative lens $L_{552}$, and a positive lens $L_{553}$. Both surfaces of the positive lens $L_{551}$ are aspheric. Further, the negative lens $L_{552}$ and the positive lens $L_{553}$ are cemented together.

The zoom lens zooms from the wide angle edge to the telephoto edge by moving the second lens group $G_{52}$, the third lens group $G_{53}$, and the fourth lens group $G_{54}$ along the optical axis. Furthermore, zooms lens corrects imaging plane (image location) variation accompanying zoom and focuses the image, by moving the fifth lens group $G_{55}$ along the optical axis. The first lens group $G_{51}$ remains fixed.

Various values related to the zoom lens according to the fifth example are indicated below.

focal length of entire zoom lens=7.80 (wide angle edge) to 22.75 (intermediate zoom position) to 58.04 (telephoto edge)

Figure 10:
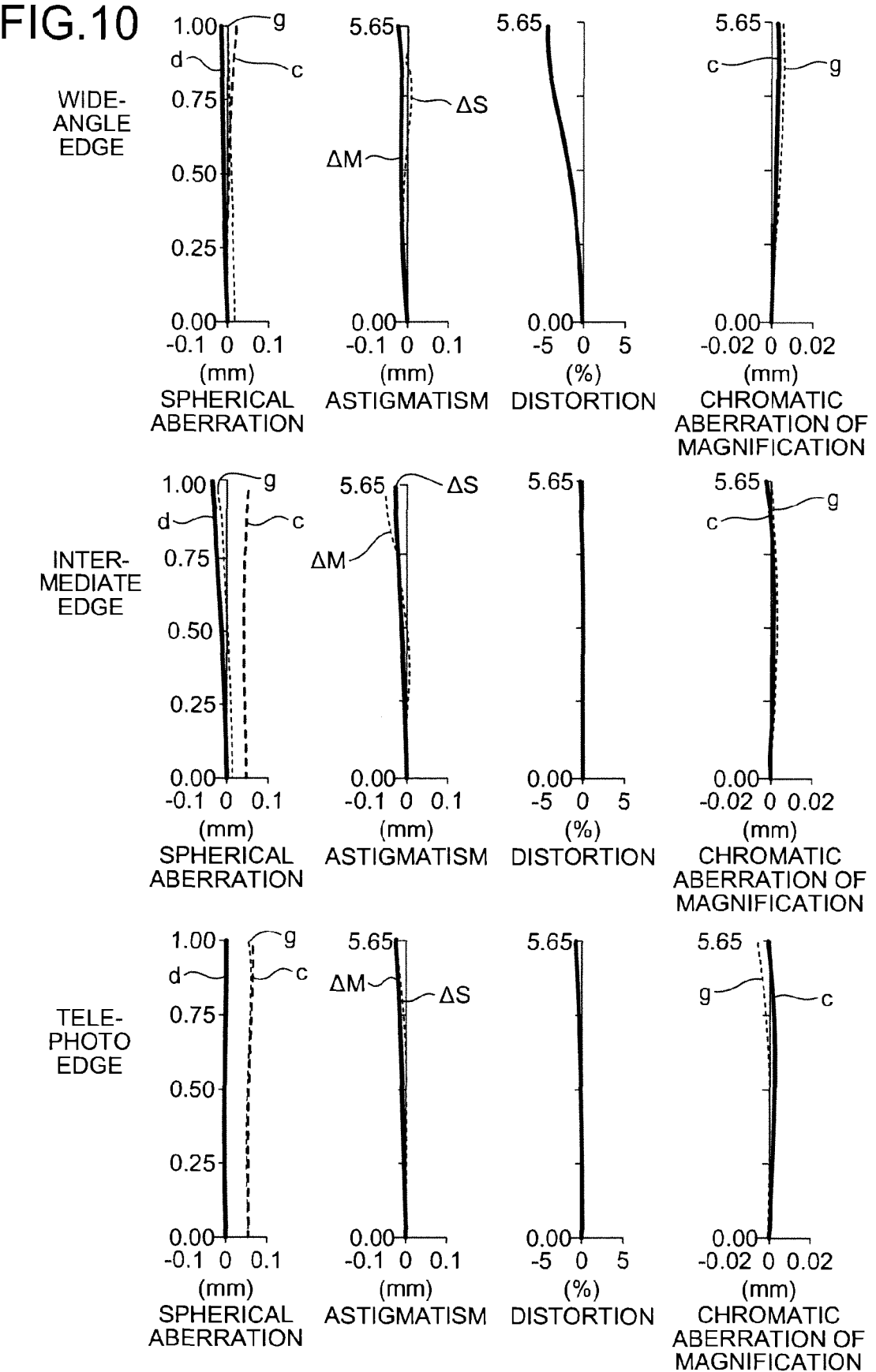
FIG. 10 is a diagram of various types of aberration of the zoom lens according to the fifth example.

F number=2.85
angle of view (2ω)=74.29° (wide angle edge) to 27.90° (intermediate zoom position) to 11.22° (telephoto edge)
(Values Related to Conditional Expression (1))
distance (SLW) from diaphragm STP at wide angle edge to imaging plane IMG=53.038
distance (SLM) from diaphragm STP at intermediate zoom position to imaging plane IMG=63.160
distance (SLT) from diaphragm STP at telephoto edge to imaging plane IMG=54.477
focal length (FW) of entire optical system for infinity at wide angle edge=7.80
(SLM−(SLW+SLT)/2)/FW=1.205
(Values Related to Conditional Expression (2))
F14t=−222.24
(Values Related to Conditional Expression (3)) deviation (S10) of paraxial curvature radius and aspheric shape at height that is 100% of effective diameter of aspheric surface on object side of lens that is farthest on object side in second lens group $G_{52}$=0.354
height (H) that is 100% of effective diameter of aspheric surface on object side of lens that is farthest on object side in second lens group $G_{52}$=29.700
S10/H=0.012
$r_1$=282.5658
  $d_1$=1.6500 $nd_1$=1.90366 $\upsilon d_1$=31.31
$r_2$=71.7229
  $d_2$=11.1441 $nd_2$=1.49700 $\upsilon d_2$=81.61
$r_3$=−269.6826
  $d_3$=0.1500
$r_4$=58.2686
  $d_4$=7.4164 $nd_3$=1.49700 $\upsilon d_3$=81.61
$r_5$=258.2745
  $d_5$=0.1500
$r_6$=60.2403
  $d_6$=4.2271 $nd_4$=1.88300 $\upsilon d_4$=40.80
$r_7$=101.8945
  $d_7$=0.9000 (wide angle edge) to 27.8306 (intermediate zoom position) to 45.9000 (telephoto edge)
$r_8$=111.4890 (aspheric surface)
  $d_8$=0.3000 $nd_5$=1.53610 $\upsilon d_5$=41.20
$r_9$=93.8724
  $d_9$=1.2000 $nd_6$=1.88300 $\upsilon d_6$=40.80
$r_{10}$=13.2527
  $d_{10}$=8.8423
$r_{11}$=−21.3522
  $d_{11}$=0.8000 $nd_7$=1.49700 $\upsilon d_7$=81.61
$r_{12}$=28.9461
  $d_{12}$=1.2651
$r_{13}$=31.9998
  $d_{13}$=5.6440 $nd_8$=1.88300 $\upsilon d_8$=40.80
$r_{14}$=−28.3373
  $d_{14}$=0.8000 $nd_9$=1.49700 $\upsilon d_9$=81.61
$r_{15}$=80.7396
  $d_{15}$=48.6273 (wide angle edge) to 11.5723 (intermediate zoom position) to 2.1726 (telephoto edge)
$r_{16}$=∞ (diaphragm)
  $d_{16}$=3.0000
$r_{17}$=90.9268
  $d_{17}$=1.6008 $nd_{10}$=1.77250 $\upsilon d_{10}$=49.62
$r_{18}$=−50.0000
  $d_{18}$=0.8000 $nd_{11}$=1.62004 $\upsilon d_{11}$=36.30
$r_{19}$=82.9067
  $d_{19}$=1.5000 (wide angle edge) to 7.2696 (intermediate zoom position) to 1.5000 (telephoto edge)
$r_{20}$=15.4903
  $d_{20}$=2.1378 $nd_{12}$=1.84666 $\upsilon d_{12}$=23.78
$r_{21}$=33.7883
  $d_{21}$=0.1500
$r_{22}$=16.2526 (aspheric surface)
  $d_{22}$=2.9662 $nd_{13}$=1.61800 $\upsilon d_{13}$=63.39
$r_{23}$=−104.1231
  $d_{23}$=1.4133 $nd_{14}$=1.90366 $\upsilon d_{14}$=31.31
$r_{24}$=11.8086
  $d_{24}$=8.4563 (wide angle edge) to 8.2596 (intermediate zoom position) to 5.9201 (telephoto edge)
$r_{25}$=16.0302 (aspheric surface)
  $d_{25}$=5.7946 $nd_{15}$=1.61800 $\upsilon d_{15}$=63.39
$r_{26}$=−38.5894 (aspheric surface)
  $d_{26}$=0.1500
$r_{27}$=−113.2219
  $d_{27}$=0.8000 $nd_{16}$=1.90366 $\upsilon d_{16}$=31.31
$r_{28}$=22.6876
  $d_{28}$=6.0000 $nd_{17}$=1.45650 $\upsilon d_{17}$=90.27
$r_{29}$=−20.1597
  $d_{29}$=11.2692 (wide angle edge) to 15.8183 (intermediate zoom position) to 15.2442 (telephoto edge)
$r_{30}$=∞
  $d_{30}$=2.0000 $nd_{18}$=1.51680 $\upsilon d_{18}$=64.20
$r_{31}$=∞
  $d_{31}$=5.0000
$r_{32}$=∞ (imaging plane)
constant of cone (K) and aspheric coefficients (A, B, C, D)
(eighth plane)
K=−137.2586,
A=2.62265×10$^{-5}$, B=−9.31163×10$^{-8}$,
C=2.21275×10$^{-10}$, D=−2.81522×10$^{-13}$
(twenty-second plane)
K=−0.0855,
A=5.22861×10$^{-6}$, B=−6.95276×10$^{-8}$,
C=1.84884×10$^{-9}$, D=−1.44193×10$^{-11}$
(twenty-fifth plane)
K=−0.2776,
A=−3.12577×10$^{-5}$, B=8.20931×10$^{-8}$,
C=−1.91427×10$^{-9}$, D=1.61775×10$^{-11}$
(twenty-sixth plane)
K=−0.6048,
A=3.43639×10$^{-5}$, B=−7.14301×10$^{-9}$,
C=−1.47690×10$^{-9}$, D=1.55904×10$^{-11}$ FIG. 10 is a diagram of various types of aberration of the zoom lens according to the fifth example. In the diagram "g", "d", and "c" respectively represent aberrations for wavelengths corresponding to g-line (λ=435.83 nm), d-line (λ=587.56 nm), and c-line (λ=656.27 nm). ΔS and ΔM, in a portion of FIG. 10 indicating astigmatism, represent aberration with respect to the sagittal image plane and the meridional image plane, respectively.

Figure 11:
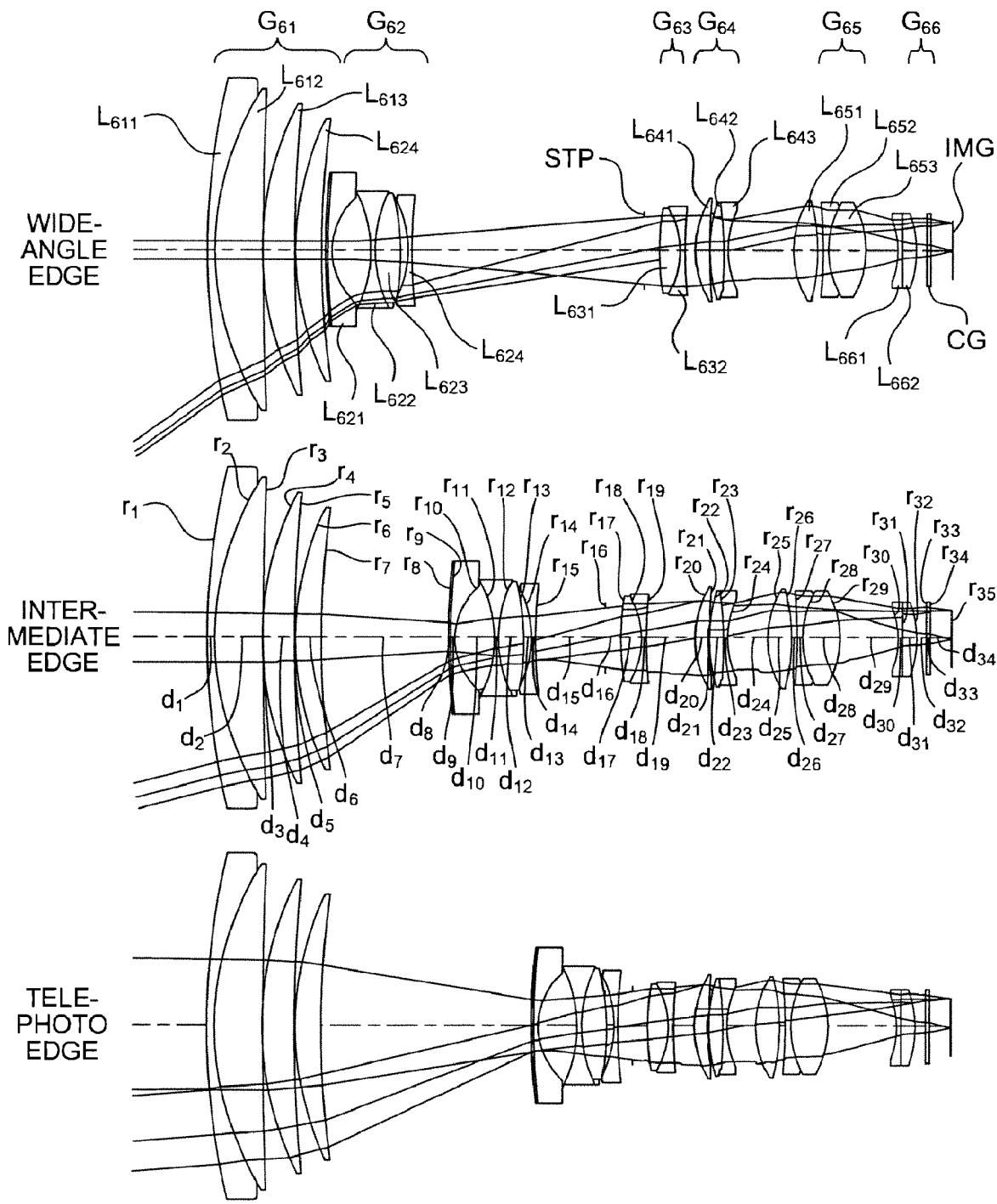
FIG. 11 is a cross sectional view (along the optical axis) of a zoom lens according to a sixth example.

FIG. 11 is a cross sectional view (along the optical axis) of a zoom lens according to a sixth example. The zoom lens includes, sequentially from the object side (not depicted), a positive first lens group $G_{61}$, a negative second lens group $G_{62}$, a positive third lens group $G_{63}$, a positive fourth lens group $G_{64}$, a positive fifth lens group $G_{65}$, and a negative sixth lens group $G_{66}$. Further, the diaphragm STP is disposed between the second lens group $G_{62}$ and the third lens group $G_{63}$. The cover glass CG (or filter) is disposed between the sixth lens group $G_{66}$ and the imaging plane IMG. The cover glass CG (or filter) is disposed as needed and may be omitted when not necessary. Further, at the imaging plane IMG, the optical receiving surface of an imaging element such as a CCD, a CMOS, etc. is disposed.

The first lens group $G_{61}$ includes, sequentially from the object side, a negative lens $L_{611}$, a positive lens $L_{612}$, a positive lens $L_{613}$, and a positive lens $L_{614}$. The negative lens $L_{611}$ and the positive lens $L_{612}$ are cemented together.

The second lens group $G_{62}$ includes, sequentially from the object side, a negative lens $L_{621}$, a negative lens $L_{622}$, a positive lens $L_{623}$, and a negative lens $L_{624}$. The negative lens $L_{622}$ and the positive lens $L_{623}$ are cemented together. Further, a surface on the object side of the negative lens $L_{621}$ is aspheric.

The third lens group $G_{63}$ includes, sequentially from the object side, a positive lens $L_{631}$ and a negative lens $L_{632}$ that are cemented together.

The fourth lens group $G_{64}$ includes, sequentially from the object side, a positive $L_{641}$, a positive lens $L_{642}$, and a negative lens $L_{643}$. A surface on the object side of the positive lens $L_{642}$ is aspheric. Further, the positive lens $L_{642}$ and the negative lens $L_{643}$ are cemented together.

The fifth lens group $G_{65}$ includes, sequentially from the object side, a positive lens $L_{651}$, a negative lens $L_{652}$, and a positive lens $L_{653}$. Both surfaces of the positive lens $L_{651}$ are aspheric. Further, the negative lens $L_{652}$ and the positive lens $L_{653}$ are cemented together.

The sixth lens group $G_{66}$ includes, sequentially from the object side, a negative lens $L_{661}$ and a positive lens $L_{662}$ that are cemented together.

The zoom lens zooms from the wide angle edge to the telephoto edge by moving the second lens group $G_{62}$ and the third lens group $G_{63}$ along the optical axis. Furthermore, the zoom lens corrects imaging plane (image location) variation accompanying zoom, by moving the fifth lens group $G_{65}$ along the optical axis. The first lens group $G_{61}$, the fourth lens group $G_{64}$, and the sixth lens group $G_{66}$ remain fixed.

Various values related to the zoom lens according to the sixth example are indicated below.

focal length of entire zoom lens=8.38 (wide angle edge) to 22.75 (intermediate zoom position) to 62.39 (telephoto edge)

F number=2.85 angle of view ($2\omega$)=70.28° (wide angle edge) to 27.57° (intermediate zoom position) to 10.30° (telephoto edge)

(Values Related to Conditional Expression (1))

distance (SLW) from diaphragm STP at wide angle edge to imaging plane IMG=63.190 distance (SLM) from diaphragm STP at intermediate zoom position to imaging plane IMG=74.408 distance (SLT) from diaphragm STP at telephoto edge to imaging plane IMG=62.659 focal length (FW) of entire optical system for infinity at wide angle edge=8.38

(SLM−(SLW+SLT)/2)/FW=1.370

(Values Related to Conditional Expression (2))

F14t=−265.26

(Values Related to Conditional Expression (3))

deviation (S10) of paraxial curvature radius and aspheric shape at height that is 100% of effective diameter of aspheric surface on object side of lens that is farthest on object side in second lens group $G_{62}$=0.544 height (H) that is 100% of effective diameter of aspheric surface on object side of lens that is farthest on object side in second lens group $G_{62}$=30.100

S10/H=0.018

$r_1$=138.8718
  $d_1$=1.6500 $nd_1$=1.80610 $\upsilon d_1$=33.27
$r_2$=61.9153
  $d_2$=8.5663 $nd_2$=1.49700 $\upsilon d_2$=81.61
$r_3$=1028.2950
  $d_3$=0.1500
$r_4$=60.3545
  $d_4$=6.3671 $nd_3$=1.49700 $\upsilon d_3$=81.61
$r_5$=295.8558
  $d_5$=0.1500
$r_6$=65.2190
  $d_6$=4.1407 $nd_4$=1.61800 $\upsilon d_4$=63.39
$r_7$=139.5672
  $d_7$=0.9000 (wide angle edge) to 25.2786 (intermediate zoom position) to 44.9569 (telephoto edge)
$r_8$=262.0586 (aspheric surface)
  $d_8$=0.3000 $nd_5$=1.53610 $\upsilon d_5$=41.21
$r_9$=138.6589
  $d_9$=1.2000 $nd_6$=1.88300 $\upsilon d_6$=40.80
$r_{10}$=16.2318
  $d_{10}$=7.7691
$r_{11}$=−26.5932
  $d_{11}$=1.0000 $nd_7$=1.49700 $\upsilon d_7$=81.61
$r_{12}$=26.5932
  $d_{12}$=5.5008 $nd_8$=1.90366 $\upsilon d_8$=31.31
$r_{13}$=−36.2017
  $d_{13}$=1.2996
$r_{14}$=−23.2275
  $d_{14}$=0.8000 $nd_9$=1.48749 $\upsilon d_9$=70.44
$r_{15}$=38.1766
  $d_{15}$=47.0041 (wide angle edge) to 11.4261 (intermediate zoom position) to 3.4734 (telephoto edge)
$r_{16}$=∞ (diaphragm)
  $d_{16}$=3.2000
$r_{17}$=47.7891
  $d_{17}$=3.0763 $nd_{10}$=1.61800 $\upsilon d_{10}$=63.39
$r_{18}$=−16.0874
  $d_{18}$=0.8000 $nd_{11}$=1.56732 $\upsilon d_{11}$=42.84
$r_{19}$=96.4756
  $d_{19}$=4.7246 (wide angle edge) to 15.9240 (intermediate zoom position) to 4.1984 (telephoto edge)
$r_{20}$=18.3644
  $d_{20}$=2.4991 $nd_{12}$=1.84666 $\upsilon d_{12}$=23.78
$r_{21}$=59.3603
  $d_{21}$=0.1500
$r_{22}$=28.9811 (aspheric surface)
  $d_{22}$=2.6325 $nd_{13}$=1.61800 $\upsilon d_{13}$=63.39
$r_{23}$=−104.8188
  $d_{23}$=0.8000 $nd_{14}$=1.90366 $\upsilon d_{14}$=31.31
$r_{24}$=16.9149
  $d_{24}$=12.7613 (wide angle edge) to 6.7184 (intermediate zoom position) to 5.8228 (telephoto edge)
$r_{25}$=17.1503 (aspheric surface)
  $d_{25}$=6.1084 $nd_{15}$=1.61800 $\upsilon d_{15}$=63.39
$r_{26}$=−34.1345 (aspheric surface)
  $d_{26}$=0.1538
$r_{27}$=−111.6006
  $d_{27}$=1.0000 $nd_{16}$=1.90366 $\upsilon d_{16}$=31.31
$r_{28}$=19.4748
  $d_{28}$=6.9286 $nd_{17}$=1.45650 $\upsilon d_{17}$=90.27
$r_{29}$=−19.4749
  $d_{29}$=8.2678 (wide angle edge) to 14.3106 (intermediate zoom position) to 15.2062 (telephoto edge)
$r_{30}$=−14.0575
  $d_{30}$=0.8000 $nd_{18}$=1.80610 $\upsilon d_{18}$=33.27
$r_{31}$=160.0140
  $d_{31}$=3.0000 $nd_{19}$=1.92286 $\upsilon d_{19}$=20.88
$r_{32}$=−18.9554
  $d_{32}$=2.2900
$r_{33}$=∞
  $d_{33}$=1.0000 $nd_{20}$=1.51680 $\upsilon d_{20}$=64.20

$r_{34}=\infty$
$d_{34}=2.9983$ (wide angle edge) to 3.0167 (intermediate zoom position) to 2.9932 (telephoto edge)
$r_{35}=\infty$ (imaging plane)
constant of cone (K) and aspheric coefficients (A, B, C, D)
(eighth plane)
K=235.8261,
A=9.85751×10⁻⁶, B=−1.48380×10⁻⁸,
C=2.78366×10⁻¹¹, D=−3.08842×10⁻¹⁴
(twenty-second plane)
K=−0.8891,
A=−4.81420×10⁻⁶, B=−1.21584×10⁻⁷,
C=1.73658×10⁻⁹, D=−1.08127×10⁻¹¹
(twenty-fifth plane)
K=−0.1835,
A=−2.65316×10⁻⁵, B=1.26633×10⁻⁷,
C=−1.04068×10⁻⁹, D=−1.23932×10⁻¹²
(twenty-sixth plane)
K=0.4017,
A=3.09450×10⁻⁵, B=1.21550×10⁻⁷,
C=−1.69140×10⁻⁹, D=2.67818×10⁻¹²

Figure 12:
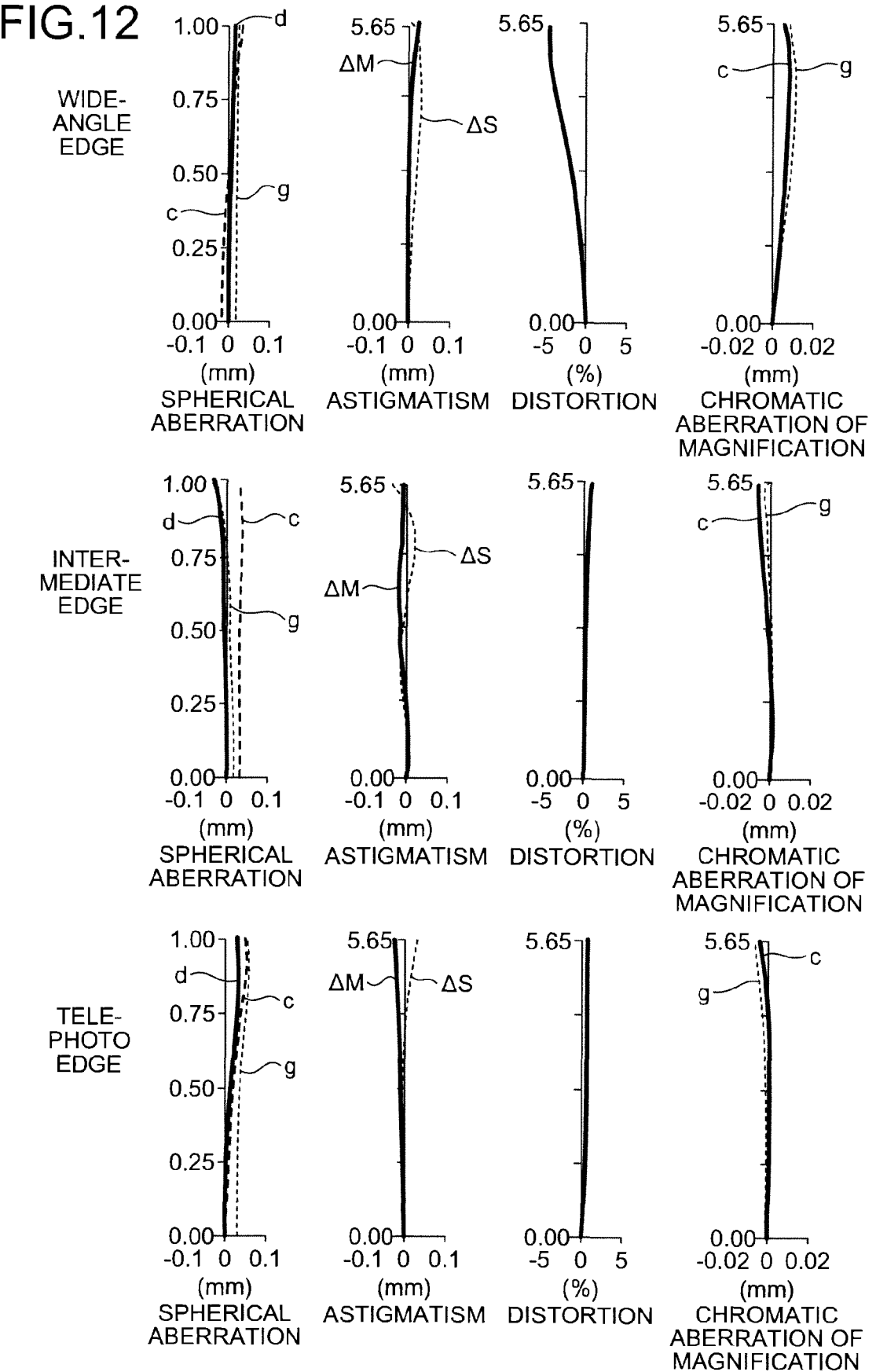
FIG. 12 is a diagram of various types of aberration of the zoom lens according to the sixth example.

FIG. 12 is a diagram of various types of aberration of the zoom lens according to the sixth example. In the diagram "g", "d", and "c" respectively represent aberrations for wavelengths corresponding to g-line (λ=435.83 nm), d-line (λ=587.56 nm), and c-line (λ=656.27 nm). ΔS and ΔM, in a portion of FIG. 12 indicating astigmatism, represent aberration with respect to the sagittal image plane and the meridional image plane, respectively.

Among the values for each of the examples above, $r_1$, $r_2$, . . . indicate radii of curvature for each lens, diaphragm surface, etc.; $d_1$, $d_2$, . . . indicate the thickness of the lenses, diaphragm, etc. or the distance between surfaces thereof; $nd_1$, $nd_2$, . . . indicates the refraction index of each lens with respect to the d-line (λ=587.56 nm); $\upsilon d_1$, $\upsilon d_2$, . . . indicates the Abbe number with respect to the d-line (λ=587.56 nm) of each lens.

Each of the aspheric surfaces above can be expressed by equation [1], where Z=the depth of the aspheric surface, y=the height from the optical axis, and the direction of travel of light is positive.

$$Z = \frac{y^2}{R\left(1 + \sqrt{1 + (1+K)y/R^2}\right)^2} + Ay^4 + By^6 + Cy^8 + Dy^{10} \quad [1]$$

And where, R is paraxial radii of curvature; K is constant of the cone; and A, B, C, D are the fourth, sixth, eighth, and tenth aspheric coefficients, respectively.

As described above, the zoom lens according to each of the examples above satisfies conditional expressions (1) and (2), whereby diameter reduction, a wide angle of view (70° or more), and maintenance of the F number at a constant value or below (2.9 or less) over the entire zoom range is achieved, making the zoom lens a large diameter zoom lens that is capable of high zoom rations (6 or more). Further, by forming a surface on the object side of the lens farthest on the object side in the second lens group, to be an aspheric surface that satisfies conditional expression (3) above, various types of aberration can be effectively corrected over the entire zoom range without sacrificing the compactness of the optical system.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A zoom lens comprising, sequentially from an object side:
  a positive first lens group;
  a negative second lens group;
  a diaphragm;
  a positive third lens group;
  a positive fourth lens group; and
  a positive fifth lens group, wherein
  a first condition 0.8≦(SLM−(SLW+SLT)/2)/FW≦2.0 and a second condition F14t≦0 are satisfied, SLW being a distance from the diaphragm at a wide angle edge to an imaging plane, SLM being a distance from the diaphragm at an intermediate zoom position to the imaging plane, SLT being a distance from the diaphragm at a telephoto edge to the imaging plane, FW being optical system focal length for infinity at the wide angle edge, and F14t being a combined focal length for the first to the fourth lens groups at the telephoto edge.

2. The zoom lens according to claim 1, wherein:
  in the second lens group, a lens farthest on the object side among lenses in the second lens group, has on the object side, an aspheric surface satisfying a third condition S10/H≧0.005, S10 being deviation of paraxial curvature radius and aspheric shape at a height that is 100% of an effective diameter of the aspheric surface and H being the height of 100% of the effective diameter of the aspheric surface.

* * * * *